(12) United States Patent
Alexy et al.

(10) Patent No.: US 11,884,817 B2
(45) Date of Patent: Jan. 30, 2024

(54) BIODEGRADABLE POLYMERIC MIXTURE AND METHOD FOR ITS PREPARATION

(71) Applicants: ENVIROCARE, S.R.O., Nitra (SK); PANARA, S.R.O., Nitra (SK)

(72) Inventors: Pavel Alexy, Pezinok (SK); Katarina Tomanova, Puchov (SK); Zuzana Vanovcanova, Bratislava (SK); Roderik Plavec, Kolarovo (SK); Jozef Feranc, Cifer (SK); Jan Bockaj, Dlha nad Oravou (SK); Leona Omanikova, Bratislava (SK); Dusan Bakos, Bratislava (SK); Ivan Hudec, Bratislava (SK); Miroslav Galambos, Nitra (SK); Miroslav Galambos, Nitra (SK); Ivana Galisova, Nadlice (SK); Dagmara Perdochova, Bratislava (SK); Patrik Jurkovic, Pezinok (SK); Radek Prikryl, Brno (CZ)

(73) Assignee: Panara, A.S., Nitra (SK)

( * ) Notice: Subject to any disclaimer, the term of this patent is extended or adjusted under 35 U.S.C. 154(b) by 386 days.

(21) Appl. No.: 16/646,482

(22) PCT Filed: Dec. 8, 2017

(86) PCT No.: PCT/SK2017/050009
§ 371 (c)(1),
(2) Date: Mar. 11, 2020

(87) PCT Pub. No.: WO2019/054951
PCT Pub. Date: Mar. 21, 2019

(65) Prior Publication Data
US 2020/0270450 A1    Aug. 27, 2020

(30) Foreign Application Priority Data

Sep. 13, 2017 (SK) ..................... 92-2017

(51) Int. Cl.
*C08L 67/04* (2006.01)
*C08L 3/02* (2006.01)
*C08L 101/16* (2006.01)
*C08J 5/18* (2006.01)

(52) U.S. Cl.
CPC ........... *C08L 67/04* (2013.01); *C08L 3/02* (2013.01); *C08L 2205/025* (2013.01); *C08L 2205/035* (2013.01)

(58) Field of Classification Search
CPC .......... C08L 67/04; C08L 3/02; C08L 101/16; C08L 2205/025; C08L 2205/035; C08L 2205/03; C08L 2367/04; C08J 2403/02; C08J 2201/06; C08J 3/005; C08J 3/203; C08J 5/18
USPC ....................................................... 524/285
See application file for complete search history.

(56) References Cited

U.S. PATENT DOCUMENTS

| 8,846,825 B2 | 9/2014 | Bastioli |
| 8,889,945 B2 | 11/2014 | Wang et al. |
| 9,156,980 B2 | 10/2015 | Bastioli |
| 9,327,438 B2 | 5/2016 | Wang et al. |
| 2006/0107945 A1* | 5/2006 | Narayan ............... C08K 3/346 127/32 |

(Continued)

FOREIGN PATENT DOCUMENTS

| CN | 101367986 | * | 2/2009 | ........... B29C 48/001 |
| DE | 102013103614 A1 | | 10/2014 | |

(Continued)

OTHER PUBLICATIONS

Yu, Long et al., Polymer blends and composites from renewable sources, Progress in Polymer Science 31, Jun. 6, 2006, pp. 576-602 (27 pages).

Tokiwa, Yutaka et al., Biodegradability of Plastics, International Journal of Molecular Sciences 10, Aug. 26, 2009, pp. 3722-3742 (21 pages).

Koch, Kristine et al, Mechanical and structural properties of solution-cast high-amylose maize starch films, International Journal of Biological Macromolecules 46, 2010, pp. 13-19 (7 pages).

Moscicki, Leszek et al., Application of extrusion-cooking for processing of thermoplastic starch (TPS), Food Research International 47, 2012, pp. 291-299 (9 pages).

(Continued)

Primary Examiner — Kelechi C Egwim
(74) Attorney, Agent, or Firm — Hovey Williams LLP; Paul J. Walker

(57) ABSTRACT

A biodegradable polymer blend contains at least one component (A), at least one component (B) and at least one component (D), wherein —component (A) includes polymers based on lactic acid —component (B) includes thermoplastic starch (TPS) representing a mixture of starch, at least one plasticizer from the group of substances (C), and at least one modifier from the group of substances (E); —group of substances (C) includes plasticizers for starch —group of substances (E) includes modifiers —component (D) includes homopolymers or copolymers of polyhydroxyalkanoates (PHAs), and/or mixtures thereof, and the biodegradable polymer blend can optionally contain a component (F), wherein —component (F) includes plasticizers for PLAs and/or for PHAs, and the biodegradable polymer blend is prepared in a such way that a composition containing the components (A), (B) and (D) is prepared by blending the components (A) and (B), wherein the component (B) is present in the blend at least in one phase of the blending process where at least one component (B) and at least one component (A) are blended concurrently, and this phase of the blending process precedes, by at least one phase, that phase of the blending process where the component (D) is added to the blend, and the optional components (F) and (G) can be added to the blend in any one or multiple phases of the blending process, and in one or several doses.

5 Claims, 4 Drawing Sheets

(56) References Cited

U.S. PATENT DOCUMENTS

| | | |
|---|---|---|
| 2009/0023836 A1 | 1/2009 | Nascimento et al. |
| 2012/0283364 A1 | 11/2012 | Sarazin et al. |
| 2016/0060451 A1 | 3/2016 | Schmidt et al. |

FOREIGN PATENT DOCUMENTS

| | | |
|---|---|---|
| EP | 0052459 A1 | 5/1982 |
| WO | 2012141660 A1 | 10/2012 |

OTHER PUBLICATIONS

Abdorezza, Mohammadi Nafchi et al., Effects of plasticizers on thermal properties and heat sealability of sago starch films, Food Hydrocolloids 25, 2011, pp. 56-60 (5 pages).

Zhang, Yachuan et al., Mechanical and Thermal Characteristics of Pea Starch Films Plasticized with Monosaccharides and Polyols, Journal of Food Science vol. 71, No. 2, 2006, pp. E109-E118 (10 pages).

Janigova, Ivica et al., Thermal degradation of plasticized poly(3-hydroxybutyrate) investigated by DSC, Polymer Degradation and Stability 77, 2002, pp. 35-41 (7 pages).

Spitalsky, Zdeno et al., Controlled degradation of polyhydroxybutyrate via alcoholysis with ethylene glycol or glycerol, Polymer Degradation and Stability 91, 2006, pp. 856-861 (6 pages).

Organ, S.J. et al., Nucleation, growth and morphology of ply(hydroxybutyrate) and its copolymers, Journal of Materials Science 26, 1991, pp. 1368-1374 (7 pages).

Billingham, N.C. et al., Degradation and Stabilisation of Polyesters of Biological and Synthetic Origin, Developments in Polymer Degradation 7, Chapter 7, Elsevier Applied Science Publishing Co., inc., 1987 (45 pages).

Yokohara, Tadashi et al., Structure and properties for biomass-based polyester blends of PLA and PBS, European Polymer Journal 44, 2008, pp. 677-685 (9 pages).

International Search Report dated Feb. 5, 2018 in Corresponding Application No. PCT/SK2017/050009 (4 pages).

Written Opinion of the International Searching Authority dated Feb. 5, 2018 in Corresponding Application No. PCT/SK2017/050009 (6 pages).

\* cited by examiner

BIODEGRADABLE POLYMERIC MIXTURE AND METHOD FOR ITS PREPARATION

RELATED APPLICATIONS

This application is the National Stage of International Patent Application No. PCT/SK2017/050009, filed Dec. 8, 2017, which is hereby incorporated herein by reference in its entirety, and which claims priority to Slovakian Patent Application No. PP 92-2017, filed Sep. 13, 2017, which is also incorporated herein by reference in its entirety.

FIELD OF THE INVENTION

The technical solution is related to biologically degradable polymer blends and method for their preparation. The present invention solves composition and method for preparation of the blend in such a way as to achieve better mechanical properties.

DESCRIPTION OF THE PRIOR ART

An interest in biodegradable polymers, mainly from renewable sources, is steadily increasing especially for two reasons: Ecological connections with their applications, in particularly in agriculture and packaging industries, but also awareness of exhaustibility of oil reserves. Bacterial polymers, polyhydroxyalkanoates (PHA), are an important class of the polymers, mainly poly(3-hydroxybutyrate) and its copolymers. In addition, use of primarily polylactic acid, or more precisely, polylactide in all forms and combinations of optically active isomers of lactic acid that is produced from agricultural products, and is easily biodegradable has grown in recent years. Lactide is the cyclic dimer prepared from lactic acid produced by fermentation of starch or sugar from different sources (L. Yu et al./Prog. Polym. Sci. 31, 576-602; 2006). PLA is polymer known for many years, but not till technologies for preparation of its monomer from agricultural raw materials had improved its economics. And today it is in the forefront of rapid development of the biodegradable plastic industry (Y. Tokiwa et al., Int. J. Mol. Sci., 10, 3722-3742; 2009).

A special class of polyesters, named polyhydroxyalkanoates (PHAs) is naturally produced by a wide range of microorganisms for which the polyesters serve as a source of carbon and energy. Poly-f-hydroxybutyrate (PHB), as the polymer from the PHA group, was studied in the scientific literature (as early as the last century) rather as a curiosity. However, only in relation to ecological aspects of production and applications of plastics, the research has been oriented towards commercialisation of PBHs, especially P3HB and some other polyhydroxyalkanoates, mainly copolymers of PHBHx, most often PHBHV and P3HB4HB. Fragility of PHB has been solved by copolymerisation of β-hydroxybutyrate with β-hydroxyvalerate (EP 0052459). In spite of the fact that polyhydroxyalkanoates can be processed on common devices intended for processing thermoplastics, problems that occur during their processing limit their commercial applications. It refers to limited conditions for processing, especially for their low thermal stability and a relatively slow kinetics of crystallization. A further limiting factor for a wider usage of PHAs is their relatively high price.

Another important polymer from natural resources is starch that is a research object for its usage in technical applications for many years. A disadvantage of starch for thermoplastic processing is its degradation even below its melting point. Starch is present in parts of plants in form of semi-crystalline starch granules composed of two polymers, namely amylose and amylopectin. A natural, unmodified starch does not possess the thermoplastic character due to its thermal degradation during heating even below its melting point. Therefore, the natural starch can be used in polymer mixtures purely as a particle filler. On other hand, natural starch can be modified to produce a thermoplastic material. A modification of natural starch to the thermoplastic starch (TPS) is based on the processes transforming starch to its thermoplastic form through interaction of heat, shear stress and plasticizers. For the high hydrophilicity and sensitivity to air humidity, starch is often mixed with other, especially hydrophobic polymers. Polymeric materials containing TPS have a relatively wide application potential. They can be used for production of packaging materials for foods, films, injection moulded products and various technical moulded pieces. The key limitations for a mass application of TPS are its high sensitivity to humidity, and a low strength. For these reasons, the research in this area focuses on solving problems specific to TPS alone, namely through blending TPS with other polymers, addition of nano-fillers to starch matrix, application of various types of plasticizers, modification of the starch alone by introducing of various functional groups, by decrease in molecular weight of starch, and so on. Essentially, TPS can be prepared by two technological procedures, namely either via casting from water solutions of starch, or through plastification in hot-melt during extrusion. In case of casting from solution, a suspension composed of a mixture of starch, plasticizers and other additives is heated to produce gelatinization of starch grains, and this mass is then spilled to a flat mat, cooled, dried, and a the produced TPS is granulated (Koch K. et al., Int. J. Biol. Macromol., 46, 13-19, 2010). This method is more suitable for laboratory research, however, the method used almost exclusively in the industrial scale environment, is extrusion. In case of the extrusion technology, a mechanical mixture of starch and plasticizer is most often dosed to extruder, wherein starch grains are destructed during extrusion at increased temperature, and by influence of shear stress, and this results in a continuous phase of amorphous starch. A residual water in starch together with plasticizer (the most frequently represented by diol or polyol, in generally by glycerol), interacts with starch through hydroxyl groups. In the given conditions, starch converts to melted form, and flows similarly as synthetic plastics (Moscicke L., et al., Food Res. Int., 47, 291-299, 2012). Due to suitable plasticizers, TPS can be prepared, and consequently processed using common plastic processing technologies. Water can be considered as the best plasticizer for starch, and it is followed by glycerol, ethylene glycol, sorbitol, fructose, glucose, urea and amino acids (Abdorezza M. N. et al. Food Hydrocolloid, 25, 56-60, 2011). According to (Zhang, Y., Han, J. H., J. Food. Sci., 71, E109-E118, 2006), glycerine can be considered as the best plasticizer for starch, simultaneously usable in the technical practice.

At present state of art, there are known various biodegradable materials and materials based on renewable resources, as well as processes for their processing, wherein final materials are often produced from a mixture of polymeric components with an adequate morphology that is given by distribution of the components, their dispersion and their interaction. The polymer blends are physical or mechanical mixtures of two or multiple polymers and other additives, mainly fillers, anti-degradants, nucleation agents or other additives. Preparation of polymer blends is often the only option how to obtain a polymeric material with properties that cannot be achieved by any of the components acting alone. Polymer blends are most often applied as engineering plastics used mainly in the automotive industry, electro industry and electronics industry. They are commonly polymer blends formed from conventional polymers (polymers based on raw materials from fossil resources, in particular crude oil and natural gas). The blends based on natural polymers usually improve some application properties of their individual components, wherein the effort is to wide use of the polymers from natural sources for products with a higher added value (many applications of biomaterials in the medicine), with a perspective of use in the packaging, mainly for the special packages intended for foods. In addition to setting the utility properties of polymer blends, their processing properties must be often improved, too. All of the three above mentioned groups of biodegradable polymers—PLAs, PHAs (mainly PHB) and TPS have as polymers-alone many disadvantages limiting their application in the standard practice. PHAs, in particular PHB, are highly sensitive to thermal degradation during processing in melt, but also to hydrolytic degradation in presence of compounds containing OH groups. Authors of the article (Janigová, I. et al. Polymer degradation and stability, 77, 35-41, 2002) found that degradation of PHB is strongly accelerated in the presence of glycerine that is a more effective pro-degradant than water as it leads to much faster alcoholysis of ester bonds of the PHB chain than is the rate of hydrolysis due to the presence of water. An even more effective pro-degradant causing alcoholysis of PHB is ethylene glycol (Spithlsky Z., et al. Polymer degradation and stability, 91, 856-861, 2006). TPS, PLAs and PHB as the biodegradable polymers from renewable natural resources are predetermined for the use in manufacturing ecologically acceptable plastic materials with excellent application properties, however, on the other side, these polymers alone are fragile, with a marginal elongation, and this represents a limitation for their potential applications. PLA and PHB are highly brittle and strength polymers, and so production of flexible products, in particular thin packaging films is problematic. TPS alone is fragile and very sensitive to ambient relative humidity. In addition, PLA and PHA including PHB are far more expensive in comparison to synthetic polymers. On the contrary, TPS is costly acceptable. From the point of view of the mechanical properties, their brittleness is the most serious disadvantage in all the three polymers. Many procedures related to improvement of PHB toughness were published. The most effective procedures include copolymerisation of β-hydroxybutyrate with β-hydroxyvalerate (Holmes et al./EP 0052459; 1982), or with other, higher homologues of polyhydroxyalkanoates. However, this procedure leads to a relatively large increase in material price (Organ S. J., Barham P. J. J. Mater. Sci. 26, 1368, 1991). Another option represents an addition of plasticizer, but the effect achieved is relatively poor. And also unsatisfactory without further modifications (Billingham N. C., Henman T. J., Holmes P. A. Development in Polymer Degradation 7, chapter 7, Elesevier Sci publ., 1987). The theoretical study of PHB/PLA blends showed that their mechanical properties are ranked somewhere between the corresponding properties of individual components. In addition, majority of these blends cannot be easily mixed with other polymers, and it is manifested by further worsening of mechanical properties (T. Yokohara and M. Yamaguchi, Eur. Polym. J. 44, 677-685; 2008). Blending of fragile PHA polymers, in particular PHB, with different types of PLA causes improvement of the processing stability for these materials in comparing with alone PHA, mainly PHB. Till now, blends of PLA and PHA are not commonly used in practice, mainly due to their limited processability and unadequate mechanical properties. On the other side, the both types of polymers are perspective, and according to theoretical studies, it can be mentioned that the mixtures have a high potential for application in the special applications, such as in food packaging. Improvement of mechanical properties, especially improvement of their toughness is disclosed in the patent application (WO 2012/141660 A1) where considerable improvement of toughness for fragile PLA and PHA, mainly PHB is achieved by their combination with at least one plasticizer of the ester type in suitable concentration ratios. Further improvement of toughness for these mixtures is achieved by application of Joncryl resins. Surprisingly, combination of fragile polymers in this solution provides a tough material.

Attempts to develop ecological materials, simultaneously fulfilling the strict technical requirements for application properties, and the economic requirements to achieve an acceptable price brought development of partly or fully biodegradable polymeric compositions produced by combination of synthetic non-biodegradable or synthetic biodegradable polymers and TPS. These include mainly mixtures of TPS in combination with PE, EVOH, PCL, PBS, PBAT, PVA and other synthetic polymers, and their mutual combinations. Also, solutions according to (U.S. Pat. No. 9,156,980 B2), (U.S. Pat. No. 8,889,945 B2), (U.S. Pat. No. 8,846,825 B2), (U.S. Pat. No. 9,327,438 B2) are included.

Mixing TPS with PHA, mainly with PHB and its copolymers is problematic as polyols, most often glycerine, contained in TPS cause an intense alcoholytic degradation of the PHA chain, and a consequent abrupt decrease in viscosity of the PHA matrix, and thereby of the whole mixture. Therefore, a considerable decrease in processing stability of the mixture takes place and simultaneously also worsening mechanical properties of the final product. A negative influence of polyols, in particular glycerine and polyethylene glycol, to PHA was described in the above mentioned articles (Janigová, I et al. Polymer degradation and stability, 77, 35-41, 2002) and (Spitalsky Z., et al. Polymer degradation and stability, 91, 856-861, 2006).

In accordance with the present state of art in the given area, the main disadvantages of blends based on biodegradable polymeric materials, in particular from renewable resources, can be identified in the following way:

1. The required processing stability of these blends, as well as their suitable mechanical properties are achieved via addition of synthetic polymers, recently mainly using PBAT, however, this decreases the whole ecological value and ecological safety of these materials.
2. Solutions leading to technically acceptable materials are economically expensive, and not satisfactorily competitive with respect to synthetic non-biodegradable as well as synthetic biodegradable materials.
3. For reasons of drop in price of the expensive ecological polymers, starch (mainly in the plasticized form) is often used as one of components, but this causes a considerable worsening the processing and mechanical properties of the materials, especially the materials containing PHA.
4. Application of TPS containing polyol as a plasticizer in the materials with present PHA leads to an abrupt decrease of the processing stability and worsening mechanical properties, and this prevents their introduction in the standard industrial practise.

SUMMARY OF THE INVENTION

The mentioned disadvantages of the ecological polymer blends known till now are solved by a blend and method for its preparation of the invention, wherein polymer components are represented by biodegradable polymers obtained or produced of raw materials from renewable sources, but with continuing use of PLA/PHA mixture, preferably a tough mixture according to (WO 2012/141660 A1), with an addition of TPS and modifier, wherein TPS is produced directly during blending with PLA, and its drying is not required prior to blending with PHA. TPS is effectively dispersed in the matrix of biodegradable polymers. A blend of PLA/PHA/TPS is produced with a good processing stability and good mechanical properties. Surprisingly, the produced homogenous blend of the invention, containing simultaneously PHA and TPS, has better mechanical properties. The required effect can be achieved only in the case that the PLA/PHA/TPS blend contains also a suitable modifier, and is prepared according to the procedure where the modifier is added to a blend with starch and PLA, prior to addition of PHA to this blend. Despite the generally known fact that plasticisers for TPS, based on the substances containing the OH groups (in particular glycerol, and other organic substances containing the OH groups), cause a strong degradation of PHA, and in this way, they worsen mechanical properties of PHA, a solution of the invention surprisingly allows to prepare a homogenous blend containing simultaneously PHA and TPS plasticized by a substances including the OH groups, wherein the final material, prepared according to the invention, shows improved mechanical properties.

Blends according to the invention are characterized by having a better tensile strength at break and/or a better relative elongation at break. The invention is aimed at preparing a homogenous biodegradable polymer blend with improved mechanical properties.

For purpose of the invention, individual terms in the present text shall have the following meaning:

Starch
"Starch" is to be understood as a substance deposited in plants through the process of photosynthetic assimilation, representing a mixture of amylose and amylopectin, and that can, in addition to these polymers, optionally contains also a small quantity of lipids, proteins and a limited quantity of water. For purposes of the invention, the term starch corresponds to a starch in the form obtained from plants by a mechanical way: via grinding and washing, without any other chemical or physical processing. For purposes of the invention, the term starch is to be understood as a starch produced from any plant, such as corn, potatoes, cereals, rice, amaranth, and further plants.

Component (A)
The term "component (A)" includes polymers based on lactic acid, mainly homopolymers of PLLA, PDLA, as well as copolymers thereof, or mixtures of homopolymers, mixtures of their homopolymers and copolymers, or mixtures of their copolymers, preferably PLA polymers exhibiting the relative elongation at break 10% or less, preferably 5% or less, and more preferably 3% or less, wherein determination of relative elongation at break is performed according to the methodology mentioned in description of the invention.

Component (B)
The term "component (B)" includes a thermoplastic starch (TPS), representing a mixture of starch, at least one plasticizer from the group of substances (C), and at least one modifier from the group of substances (E), wherein
group of substances (C) includes plasticizers for starch, especially one-, two- and multiple hydroxyl groups containing alcohols and polyols, in particular glycerine, ethylene glycol, propylene glycol, diols, triols and polyols, poly-ethylene glycol, poly-propylene glycol, neopentyl glycol, further sorbitol, mannitol;
group of substances (E) includes modifiers, in particular saturated or unsaturated carboxylic, dicarboxylic, tricarboxylic or polycarboxylic acids, saturated or unsaturated anhydrides, dianhydrides and polyanhydrides, and mixed anhydrides of carboxylic acids, substances containing the isocyanate groups, preferably diisocyanates, substances containing epoxide groups, halogenides of the carboxylic acids, acylimidazoles, acylphosphates, tioesters of acids, or combination thereof.

Component (D)
The term "component (D)" includes homopolymers or copolymers of polyhydroxyalkanoates (PHA), and/or their mixtures, but preferably homopolymers or copolymers based on PHB, and/or their mixtures, but more preferably homopolymers or copolymers based on P3HB, and/or their mixtures, and the most preferably if copolymers based on P3HB are copolymers of P3HB4HB, preferably the PHA homopolymers or copolymers with the value of relative elongation 10% or below, preferably 5% or below, more preferably 3% or below, wherein determination of the relative elongation at break is performed according to the methodology mentioned in description of the invention.

Component (F)
The term "component (F)" includes plasticizers for PLA and/or for PHA, preferably esters and low viscosity polyesters, mainly esters or low viscosity polyesters of citric acid, esters or low viscosity polyesters of glycerine, esters or low viscosity polyesters of diols and polyols, esters or low viscosity polyesters of phosphoric acid, esters or low viscosity polyesters of sebacic acid, esters or low viscosity polyesters of adipic acid, esters or low viscosity polyesters of phthalic acid, and other liquid esters or low viscosity polyesters and copolyesters, or their mixtures, wherein the viscosity of a plasticizer for PLA and/or PHA (component (F)) measured at 25° C. according to the procedure mentioned in description of the invention is 20,000 mPas or below, preferably 5,000 mPas or below, and more preferably 3,000 mPas or below.

Group of Substances (G)
The term "group of substances (G)" includes additives for modification of the processing and/or application properties of blends, wherein the group of substances (G) includes mainly inorganic or organic fillers, compatibilizers and interphase agents, pigments and dyes, nucleating agents, processing aids, anti-block and slip additives, cross-linking additives, foaming agents, anti-static additives, flame retardants, antidegradants, and other additives and modifiers, including polymers and oligomers for modification of the processing and/or application properties of blends.

Blending Process

The term "blending process" includes the procedure of blending at least two components of a blend in one or several blending devices designed to prepare polymer blends, wherein the blending devices can be represented by, for example, single screw extruder or twin screw extruder, wherein the blending process is completed once a final blend is created, that is then, after output from a last blending device, cooled and granulated, but the blend can be optionally transported to a device for making of final products, such as for example cast-extruded films.

Blending Step

The term "blending step" represents a blending process in which individual components are introduced under the prescribed technological conditions, all at once or sequentially, depending whether one blending step includes one or multiple phases of the blending process. Blending step starts by introducing at least one component to a blending device, and ends by the output of a final blend or a blend of at least two prescribed components from the blending device.

Phase of Blending Process

The term "phase of blending process" corresponds to a time interval required for blending of the prescribed number of components of the blend, wherein one phase of the blending process starts at the moment of introduction of the prescribed components of given blend to a blending device, and ends once the blending process is either completed or interrupted, or by input of other, at least one component of blend to a continuous blending process. Addition of at least one component to the continuous blending process is always start of the next phase of the blending process.

Extrusion Step

The term "extrusion step" is the blending step performed in an extruder, preferably in a single-screw extruder, more preferably in a twin-screw extruder.

Dryblend

The term "dryblend" refers to a free-flowing powder mixture of at least two components that are physically mixed at the laboratory temperature, regardless of whether liquid substances are admixed to the mixture or not.

A subject matter of the invention includes composition and preparation of a biodegradable polymer blend based on PLA, PHA and TPS, wherein the blend contains at least 3 components: PLA (component (A)), PHA (component (D)), TPS (component (B)), and optionally plasticiser for PLA and/or PHA (component (F)), wherein TPS is based on a mixture of starch, plasticizer for starch (substance from the group (C)) and modifier (substance from the group (E)). A solution according to the invention is characterized by ability to use the most effective plasticizers for starch as plasticizer for TPS preparation, in especially alcohols and polyols, mainly glycerine, ethylene glycol, propylene glycol, diols, triols and polyols, polyethylene glycol, polypropylene glycol, neopentyl glykol, as well as sorbitol, mannitol. Further, the solution is characterized by use of such modifiers that show a high reactivity with OH groups, namely, in particular saturated or unsaturated compounds containing the isocyanate, anhydride, carboxylic or epoxy reactive groups, then halides of carboxylic acids, acyl imidazoles, acyl phosphates, thioesters from carboxylic acids, anhydrides of saturated or unsaturated carboxylic acids. Further, the solution is characterized by presence of component (B) together with component (A) in blending process prior to addition of component (D) to the blend. Use of the modifiers containing unsaturated bonds in their molecules, mainly double bond, allows further modification of the blends prepared in such a way, using for example cross-linking and/or grafting, e.g. in presence of peroxides. The solution of the invention uses the blend of PLA/PHA/plasticizer as a polymeric matrix, wherein ester or low viscosity polyester (component (F)) is a plasticizer for PLA and/or PHA. The solution of the invention includes then a blend prepared from biopolymers, and containing at least one PLA polymer (component (A)), at least one PHA polymer (component (D)) and TPS (component (B)), and characterized by improved mechanical properties, wherein TPS (component (B)) is based on a blend of starch, plasticizer (substance from the group (C)) and a reactive modifier (substance from the group (E)).

A procedure for preparation of the blend according to the invention is characterized by the following sequence: at first, TPS (component (B)) and PLA are blended, and then PHA is introduced to the blend, wherein the process can be performed as a single or multiple step blending process, preferably a single or multiple step extrusion, without need of removal of excessive water from hot-melt before blending PHA with TPS, or PHA with the TPS+PLA blend.

For reasons of the invention, if description of the invention, examples of embodiment or patent claims mention any concentration expression of the blend composition, mutual ratios of the blend components, or percentage composition of the blend, they are to be always understood as expression in weight units.

The invention discloses a biodegradable polymer blend with enhanced mechanical properties, and procedure for its preparation. The biodegradable polymer blend of the invention contains at least one component (A), at least one component (B), at least one component (D) and may contain component (F) or not. The biodegradable polymer blend of the invention relates to blend containing TPS—component (B)—wherein ratio of the other two blend components, (A) and (D), is in a wide range, wherein there are achieved improved mechanical properties represented by relative elongation at break $\varepsilon_b$ and/or tensile strength $\sigma_M$, wherein relative elongation at break $\varepsilon_b$ is higher than 100%, or tensile strength $\sigma_M$ is higher than 15 MPa, preferably higher than 20 MPa, and more preferably higher than 25 MPa.

The blends of the invention are characterized in such a way that if they contain only components (A), (B), (D), and optionally component (G), their tensile strength $\sigma_M$ is equal or higher than 15 MPa, preferably equal or higher than 20 MPa, and more preferably equal or higher than 25 MPa, wherein relative elongation at break $\varepsilon_b$ is higher or equal than 2.0%. If the blends of the objection contain component (F), they have relative elongation at break $\varepsilon_b$ higher or equal than 100%, wherein their tensile strength $\sigma_M$ is higher or equal than 3.0 MPa, preferably is higher or equal than 5.0 MPa, preferably is higher or equal than 10 MPa.

The blends of the invention are characterized in such a way that if they have relative elongation at break $\varepsilon_b$ lower than 100%, their tensile strength $\sigma_M$ is equal or higher than 15 MPa, preferably equal or higher than 20 MPa, preferably equal or higher than 25 MPa.

The blends of the invention are characterized in such a way that if they have tensile strength $\sigma_M$ lower than 10 MPa, preferably lower than 15 MPa, their relative elongation at break $\varepsilon_b$ is equal or higher than 100%.

The mentioned effect is achieved by a such composition of the blends where ratio of the components (A)/(D) is in the range of 5/95 to 95/5, preferably of 10/95 to 95/5, more preferably of 20/80 to 95/5, even more preferably of 30/80 to 95/5, even more preferably of 20/80 to 90/10, even more preferably of 20/80 to 80/20, even more preferably of 30/70 to 70/30.

The mentioned effect is achieved by a such quantity of starch used in the component (B) that the ratio [(A)+(D)]/(starch) is in the range of 97/3 to 40/60, preferably of 97/3 to 50/50, more preferably of 97/3 to 70/30.

Further, the mentioned effect is achieved by a such quantity of a substance from the group (C) in component (B) that the ratio of substance from the group (C)/starch is at least 5/95, preferably at least 10/90, more preferably at least 20/80, even more preferably at least 30/70, even more preferably at the most 40/60, even more preferably at the most 50/50.

Further, the mentioned effect is achieved by a such quantity of a substance from the group (E) that the ratio (E)/[starch+(C)] was at least 0.05/100, preferably at least 0.1/100, more preferably at least 0.5/100, even more preferably at least 1.1/100, even more preferably up to 10/100, even more preferably up to 5/100, and even more preferably up to 3.0/100.

Further, the mentioned effect is achieved in such a way that the blend can contains a substance from the group (F) or not. If the blend contains a substance from the group (F), then in order for the blend to achieve relative elongation at least 100, the ratio (F)/[(A)+(D)] should be at least 5/95, preferably at least 7/93, more preferably at least 10/90, even more preferably at least 15/85, even more preferably at the most 50/50, even more preferably at the most 40/60, and even more preferably at the most 30/70.

Further, a biodegradable blend of the invention can contains other substances to acquire specific, in particular the processing and application properties of the blend, specifically the substances from the group (G), such as inorganic or organic fillers, compatibilizers and interphase agents, pigments and dyes, nucleating agents, processing aidss, antiblock and slip additives, crosslinking additives, foaming agents, antistatic additives, flame retarders, antidegradants, and other additives and modifiers, including polymers and oligomers.

A method for preparation a blend of the invention is characterized by using any blending device for production of polymer blends to prepare the blend, wherein production of the blend can be performed either in one or multiple blending steps, preferably in single or two steps, more preferably in one step, wherein preferably extruders are used as blending devices, more preferably single or twin screw extruders.

No matter whether the blending process consists of one or several steps, a method of the invention is characterized by presence of component (B) in the blend during at least one phase of the blending process where simultaneously at least one component (B) and one component (A) are blended, and as an option, component (F) and/or component (G) can be present. This blending phase of blending process precedes by at least one phase that blending phase of the blending process where component (D) is added to the blending process.

A method of preparation is characterized in such a way that component (D) is added to the blend by at least one blending phase afterwards, after mutual blending at least only one component (B) and at least one component (A).

A solution of the invention is also characterized by preparation of TPS—component (B) via plasticization of starch during preparation of blends, it needn't be prepared separately.

A method for preparing blends of the invention is also characterized in such a way that if one or several components (F) are added to a blend, wherein the components provide development of the mixture with increased toughness, component (F) can be added in any one or multiple phases of the blending process, and in one or several doses.

Further, a method for preparing blends of the invention is characterized in such a way that preferably another additive from the group (G), modifying properties of the final blend, can be added to a blend, wherein such substances can be added in any one or multiple phases of the blending process, and in one or several doses.

A method for preparing of the invention is also characterized by removal of excessive water from the blend by atmospheric or vacuum degassing only in last phases of the blending process, at the earliest after that phase, where at least component (A), component (B) and component (D) were already contained in the blend. A method for preparing of the invention is also characterized in such a way that any blending device for preparation of polymer blends can be used, preferably an extruder, more preferably a single screw or twin screw extruder, and even more preferably a corotating twin screw extruder whose screws overlap each other. In case of a multi-step blending process, a different type of blending device can be used in every blending step.

Further, a method for preparing blends of the invention is characterized in such a way that preferably a twin screw extruder is used as a blending device, wherein the twin screw extruder is equipped besides dosing devices to a main feeding hopper, also by pumps allowing dosage liquids to hot melt along the extruder, and by side screw feeders allowing dosage of solid components of blend to hot melt of the blended mixture, and further also preferably equipped by atmospheric or vacuum degassing in a last part of the extruder, and preferably equipped also by a device for air or liquid cooling of an extruded strand, as well as by a device granulating the extruded strand. Moreover, a procedure for production of blends, designed in such a way, can be equipped (as a replacement of a granulation device) by a head and by a device for production of final products, e.g. blown or cast films, extruded opened or closed profiles, and so on.

DETAILED DESCRIPTION OF THE INVENTION

Figure 1:
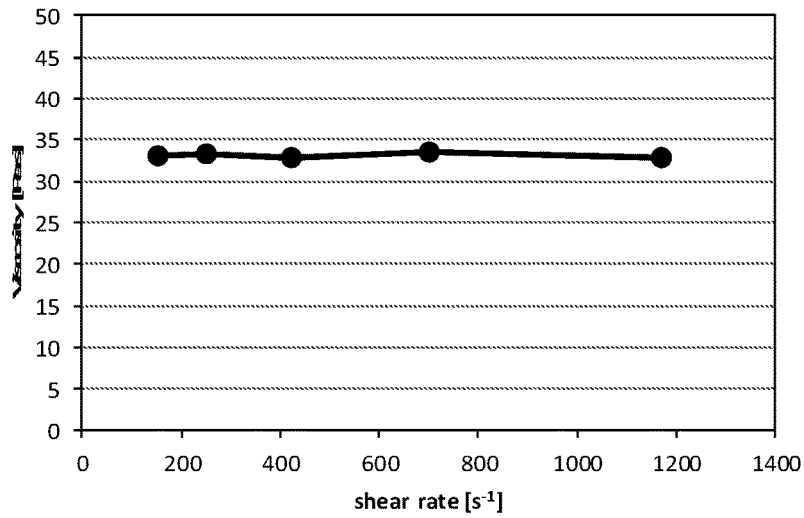
FIG. 1. Example of the dependence of viscosity on shear rate of the plasticiser acetylbutylcitrate, measured according to STN ISO 3219

The below mentioned procedures were used to determine properties of blend of the invention:

Measuring Mechanical Properties of Blends

Mechanical properties of blends of the invention were measured according to the standard STN ISO 527 on the tensile testing device Zwick Roell equipped by a mechanical extensometer, wherein measurement was carried out at the temperature 25° C., relative air humidity (RH) 50%, and rate of cross head speed 50 mm/min. The clamping length of the testing piece was 50 mm, and the distance of extensometer grips was 30 mm. According to STN ISO 527, the parameters: relative elongation at break $\varepsilon_b$ and tensile strength $\sigma_M$ were evaluated by analysis of tensile curves.

Testing Pieces for Mechanical Properties Measurements and their Preparation

To prepare testing pieces for mechanical properties measurements, films of the thickness 0.040 mm were produced of used blends by chill roll technology, specifically via extrusion of hot-melt of blend on water-cooled cylinders of the laboratory chill roll line, including the following individual devices:

Take off unit (fy Göttfert) equipped by two consecutive water-cooled cylinders, and further by a take-off and winding units. The temperature of cooled cylinders: 20° C.

The extruder head with a flat die of the width 70 mm, and 0.4 mm slit thickness, connected either directly to the extruder of the last extrusion step, as a replacement of granulation device, or connected to the laboratory single-screw extruder (Brabender) with 19 mm screw diameter, ratio L/D=25 and the screw compression ratio 1:2. Screw geometry: A smooth screw without mixing elements with a steady increasing diameter of the screw core. In case of the used single-screw extruder produced by the company Brabender, the processing parameters were as follow:

The hot melt temperature: 190° C.

The screw revolutions: 30 rev/min

Blown films produced in this way were immediately after the production cut to tapes of 15 mm width and 100 mm length, forthwith placed to a conditioning cabinet to allow conditioning the samples for 24 hours at 25° C. and 50% RH. Mechanical properties were measured immediately after the 24 hour conditioning period.

Measurement of Plasticizer Viscosity

The viscosity of plasticizers was measured using the coaxial-cylinder rotational viscometer—Haake rheoviscometer. Measurement was carried out at 25° C., in accordance with STN ISO 3219, wherein the viscosity value was the average value of all measurements within the shear rate range of 152 $s^{-1}$ to 1170 $s^{-1}$, as all measured fluids showed the Newtonian fluid character. An example of the dependence of viscosity on shear rate of the plasticiser acetylbutylcitrate is shown on FIG. 1.

Examples of methods for preparing biodegradable polymer blends can include the following: Two-step or single-step alignment alternatives for preparation of blends, using twin-screw extruders, wherein the mentioned following examples are non-limiting, i.e. other alternatives of the blending process alignment are possible, too. Extruders on Figures are schematically drawn, wherein division of any extruder to zones is only illustrative, and does not represent the specific order of zones or the specific order of the blending process phases.

1. Two-Extrusion Preparation

Procedure PA

According to procedure PA, it is prepared a dryblend (DB_A) consisting of at least starch, at least one plasticizer from the group of substances (C), and at least one modifier from the group of substances (E), wherein, in addition to these components, the dryblend can contains other additives from the group of substances (G), or not. During the first extrusion step PA1, the dryblend is fed to a hopper of co-rotating twin-screw extruder together with at least one component (A). Then, using a pump, component (F) is dosed to a melted mixture, if it is necessary for final properties of the blend. After output from the extruder, the blend is cooled, and granulated without exhausting excessive water. The prepared pellets are then fed again to a hopper feeder of the twin-screw extruder during the second extrusion step PA2 together with at least one component (D). In case of necessity, other component F can be again fed to hot-melt using a pump. At the end of extruder, excessive water is removed via a vacuum degassing zone, the mixture is cooled using air- or fluid-cooling, and granulated. Humidity of the final pellets can be (if it is necessary) adjusted by drying, and then further processed. A granulation unit can by preferably replaced by a production unit producing some final products (chill roll films, blown films, etc.), that is connected to the extruder in step PA2. Other substances from the group (G) can be added (if it is necessary) to mixture either to an extruder hopper during the first extrusion step PA1, or to hot-melt along the extruder using a side feeder. By the similar way, other additives from the group (G) can be dosed also in the second extrusion step PA2. The procedure is schematically drawn on FIG. 2.

Procedure PB

According to procedure PB, it is prepared a dryblend (DB_B), consisting of at least starch, at least one substance from the group (C), and at least one modifier from the group of substances (E), wherein, in addition to these components, the dryblend can contains other additives from the group of substances (G), or not. The dryblend is fed to a hopper of the co-rotating twin-screw extruder during the first extrusion step PB1. Then, at least one component (A) is dosed to a melted mixture using a pump, and after that, component (F) can be dosed to the hot-melt if it is necessary for final properties of blend. After output from the extruder, the produced blend is cooled and granulated without exhausting excessive water. Thereafter, the formed pellets are fed again to a hopper of the twin-screw extruder during the second extrusion step PB2, together with at least one component (D). If necessary, it is possible to dose again other component (F) to hot-melt in extruder, using a pump. At the end of extruder, excessive water is removed via the vacuum or atmospheric degassing zone, the blend is cooled by air or fluid, and granulated. Granulation can be omitted, and during step PB2, some device for production of final products can be preferably attached to the extruder as a replacement of a granulation unit. Produced final products can include chill roll films, blown films etc.) Prior to further processing, humidity of the final pellets can be (if necessary) adjusted by drying. In case of necessity, other substances from the group (G) can be dosed to hot-melt either during the first extrusion step PB1—to an extruder hopper, or to hot-melt along the extruder, using a side feeder. By the similar way, other additives from the group (G) can be dosed also in the second extrusion step PB2. The procedure is schematically drawn on FIG. 3.

Procedure PC

According to procedure PC, it is prepared a dryblend (DB_C), consisting of at least starch, and at least one modifier from the group or substances (E), wherein in addition to these components, the dryblend can contains other additives from the group of substances (G), or not. The dryblend is fed to a hopper of the co-rotating twin-screw extruder during the first extrusion step PC1. Then, at least one plasticizer from the group (C) is dosed to hot-melt using a pump, and after that at least one component (A), and if is necessary for final properties of blend, also component (F) is then dosed to a melted mixture, using a pump.

After output from extruder, the produced blend is cooled and granulated without exhausting excessive water. Thereafter, the formed pellets are dosed again to a hopper of the twin-screw extruder during the second extrusion step PC2, together with at least one component (D). If necessary, it is possible to dose again other component (F) to hot-melt in extruder, using a pump. At the end of extruder, excessive water is removed via the vacuum or atmospheric degassing zone, the blend is cooled by air or fluid, and granulated. Prior to further processing, humidity of the final pellets can be (if necessary) adjusted. During step PC2, some unit for production of final products can be preferably attached to the extruder as a replacement of a granulation unit. Produced final products can include chill roll films, blown films etc.).

In case of necessity, other substances from the group (G) can be dosed to hot-melt either during the first extrusion step PC1—to an extruder hopper, or to hot-melt along the extruder, using a side feeder. By the similar way, other additives from the group (G) can be dosed during the second extrusion step PC2, too. The procedure is schematically drawn on FIG. 4.

Figure 2:
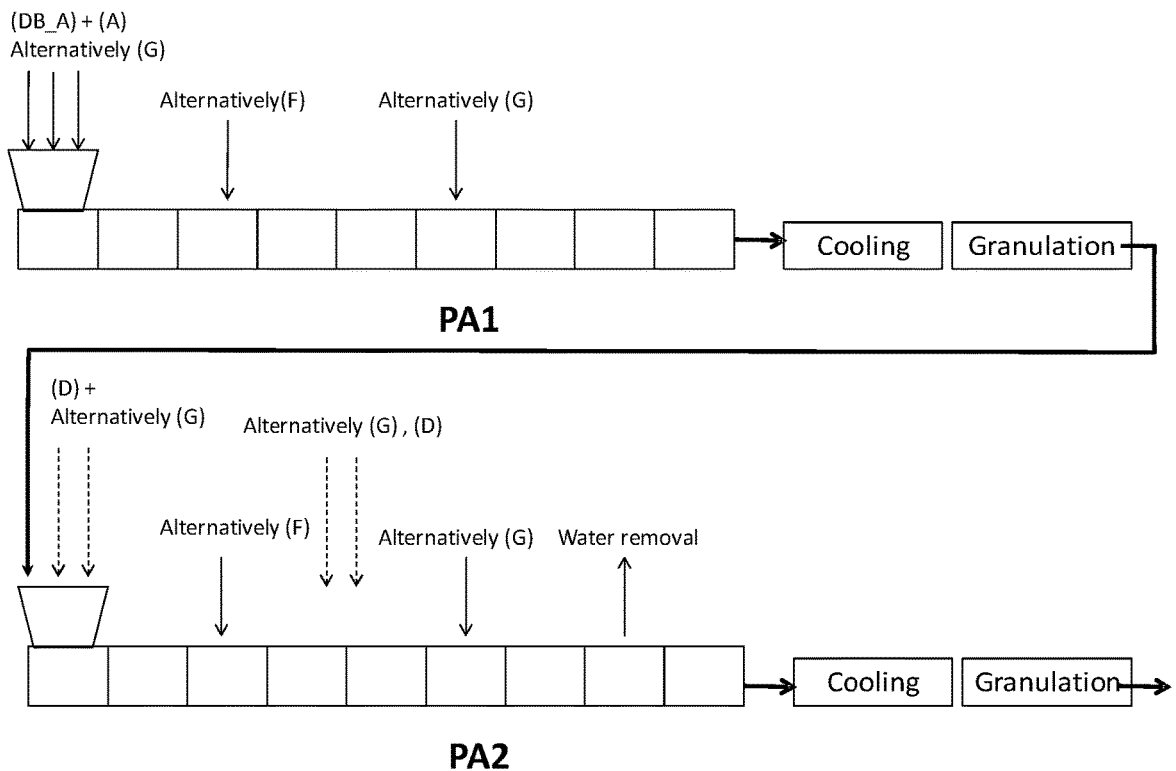
FIG. 2 Scheme of the process for producing a polymer blend according to procedure PA in the two extrusion steps, PA1 and PA2
Figure 3:
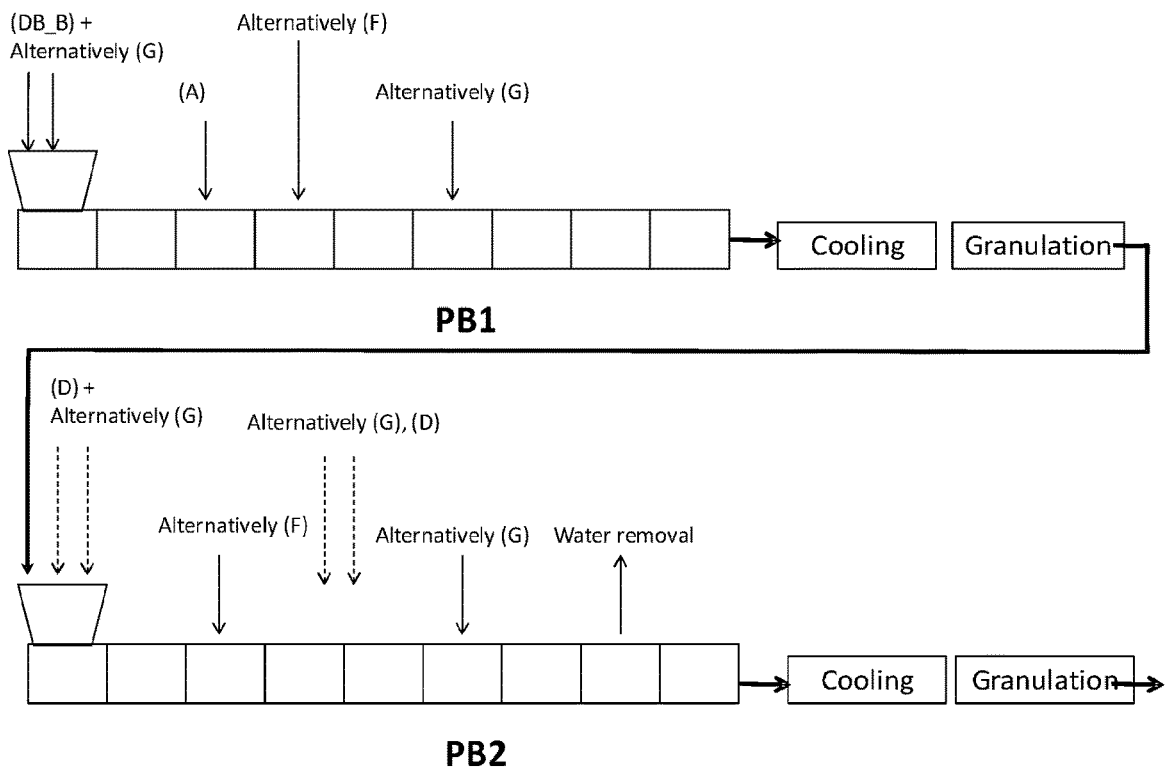
FIG. 3 Scheme of the process for producing a polymer blend according to procedure PB in the two extrusion steps, PB1 and PB2
Figure 4:
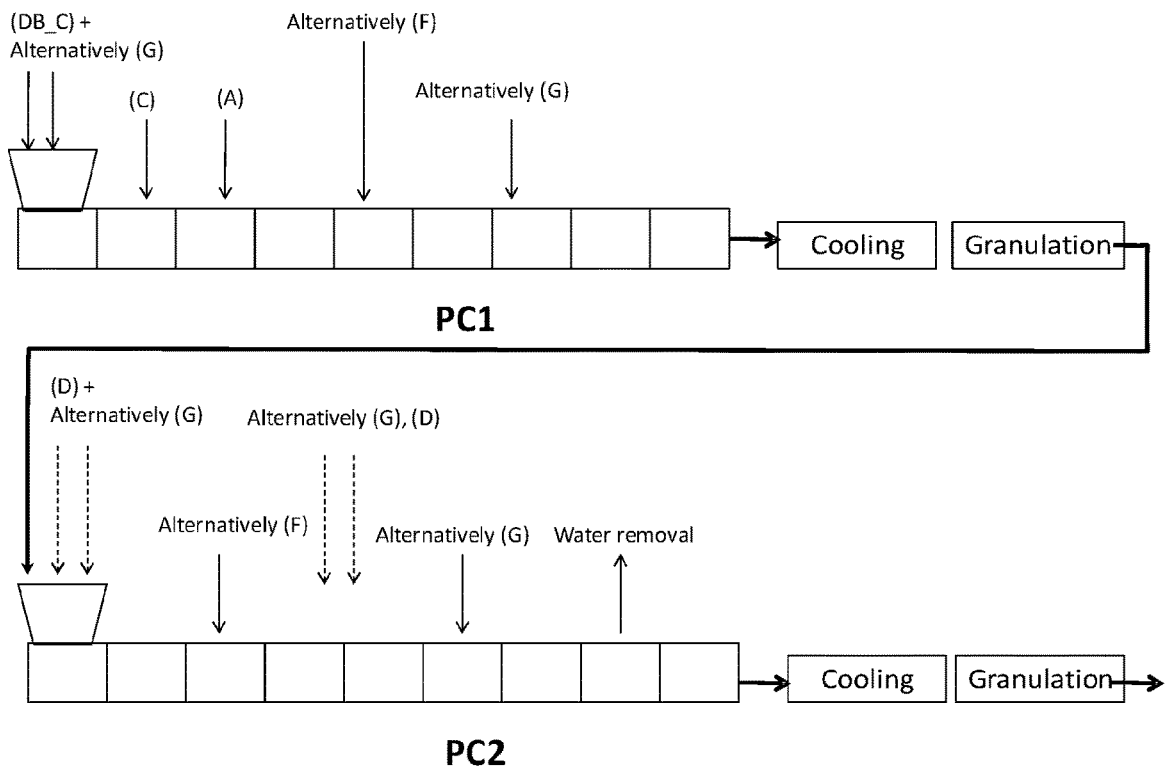
FIG. 4 Scheme of the process for producing a polymer blend according to procedure PC in the two extrusion steps, PC1 and PC2

Alternatively, for all the procedures, PA to PC, PHA (component (D)) can be dosed during the second extrusion step PA2 to PC2 not only to a hopper but also and/or to hot-melt, using a side feeder, prior to or after dosing the component (F)—FIG. 2-4.

2. One-Extrusion Preparation

Procedure PD

Figure 5:
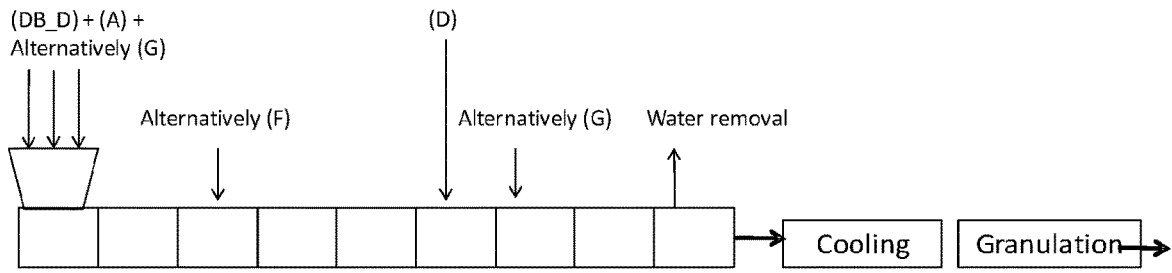
FIG. 5 Scheme of the process for producing a polymer blend according to procedure PD in a single extrusion step FIG. 6 Scheme of the process for producing a polymer blend according to procedure PE in a single extrusion step FIG. 7 Scheme of the process for producing a polymer blend according to procedure PF in a single extrusion step FIG. 8 Scheme of the process for producing a polymer blend according to procedure G in the two possible alternatives, PG1 and PG2

According to procedure PD, it is prepared a dryblend (DB_D) consisting of at least starch, at least one plasticizer from the group of substances (C), and at least one modifier from the group of substances (E), wherein, in addition to these components, the dryblend can contains other additives from the group (G), or not. Dryblend is fed to a hopper of the co-rotating twin-screw extruder together with at least one component (A) Then, if it is necessary for final properties of blend, component (F) is dosed to hot-melt in the extruder, using a pump, and at least one component (D) is dosed through a side feeder in the second half of the extruder, and then, in case of necessity, additives from the group of substances (G) are dosed. At the end of extruder, excessive water is removed via a vacuum or atmospheric degassing zone, the blend is cooled using air- or fluid-cooling, and granulated. Humidity of the final pellets can be (if it is necessary) adjusted by drying prior to further processing the pellets. Some device for production of final products can be preferably attached to the extruder as replacement of a granulation unit. Final products can include chill roll films, blown films, and etc.). The procedure is schematically drawn on FIG. 5.

Procedure PE

Figure 6:
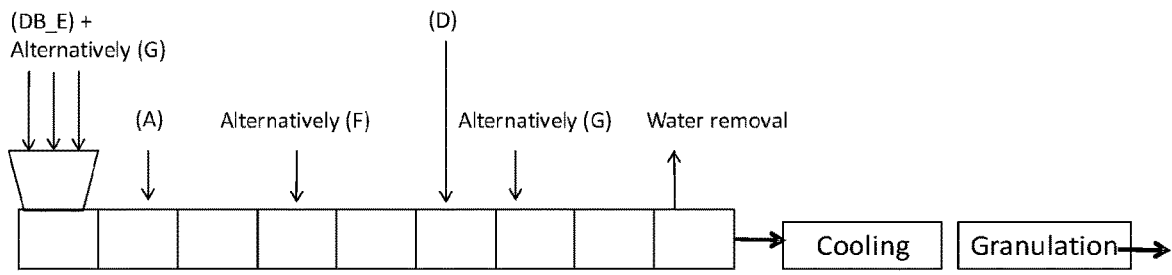

According to procedure PE, it is prepared a dryblend (DB_E) consisting of at least starch, at least one plasticizer from the group of substances (C), and at least one modifier from the group of substances (E), wherein, in addition to these components, the dryblend can contains other additives from the group of substances (G), or not. The dryblend is dosed to a hopper of the co-rotating twin-screw extruder, and after that, at least one component (A) is dosed. In other part of extruder, component (F) is dosed using a pump, if it is necessary for final properties of blend. In the second half of extruder, at least one component (D) is dosed through a side feeder, and then, in case of necessity, additives from the group of substances (G) are dosed. At the end of extruder, excessive water is removed via a vacuum degassing zone, the mixture is cooled using air- or fluid-cooling, and granulated. Humidity of the final pellets can be if necessary adjusted by drying prior to further processing of pellets. Some device for production of final products can be preferably attached to the extruder as a replacement of a granulation unit. Produced final products can include chill roll films, blown films etc. The procedure is schematically drawn on FIG. 6.

Procedure PF

Figure 7:
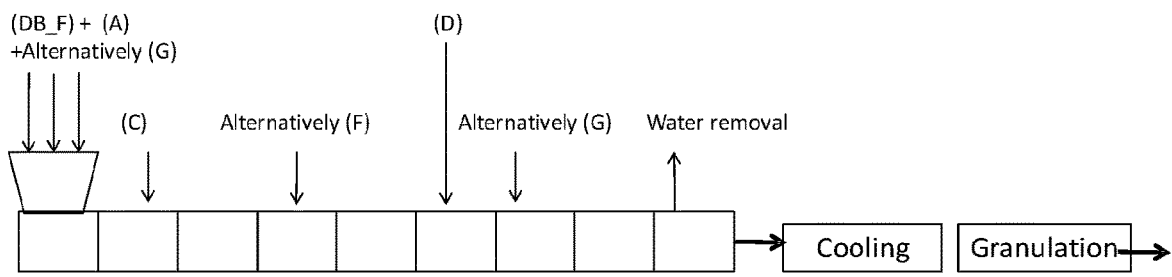

According to procedure PF, it is prepared a dryblend (DB_F), consisting of at least starch, and at least one modifier from the group of substances (E), wherein, in addition to these components, the dryblend can contains other additives from the group of substances (G), or not. The dryblend is fed to a hopper of the co-rotating twin-screw extruder together with at least one component (A), and after that, at least one plasticizer from the group of substances (C) is dosed to the extruder using a pump. In other part of extruder, component (F) is dosed using a pump, if it is necessary for final properties of the blend. In the second half of extruder, at least one component (D) is dosed through a side feeder, and then, in case of necessity, additives from the group of substances (G) are dosed. At the end of extruder, excessive water is removed via a vacuum degassing zone, the blend is cooled using air- or fluid-cooling, and granulated. Prior to further processing, humidity of the final pellets can be (if necessary) adjusted by drying. As a replacement of granulation, some device for production of final products can be preferably attached to the extruder. Produced final products can include chill roll films, blown films and etc. The procedure is schematically drawn on FIG. 7.

Figure 8:
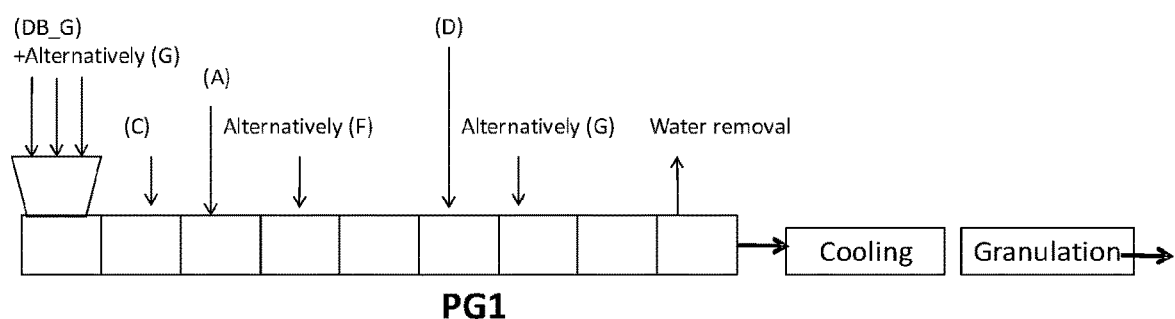
Figure 8:
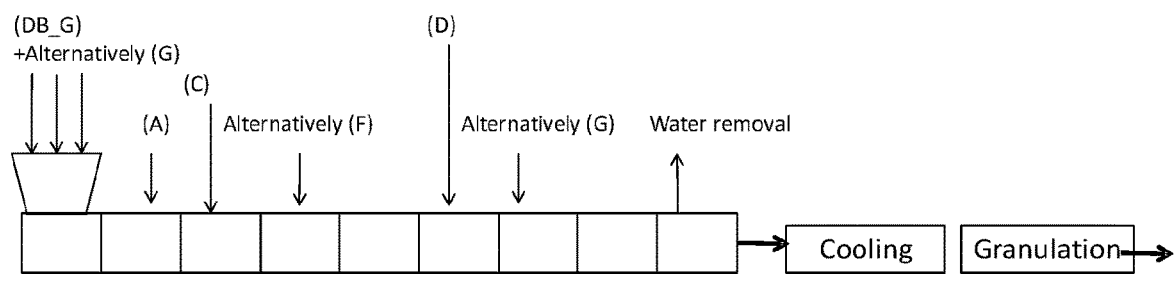

Procedure PG According to procedure PG, it is prepared a dryblend (DB_G) consisting of at least starch, at least one modifier from the group of substances (E), wherein, in addition to these components, additives from the group of substances (G) can be contained or not. The dryblend is fed to a hopper of co-rotating twin-screw extruder, and after that, at least one plasticizer from the group of substances (C) is dosed to hot-melt in extruder, and then at least one component (A) —procedure PG1, or at first at least one component (A), and after that, at least one plasticizer from the group of substances (C)—procedure PG2. In other part of extruder, plasticizer from the group of substances (F) is dosed using a pump, if is necessary for final properties of blend. In the second half of extruder, at least one component (D) is dosed through a side feeder, and then, in case of necessity, additives from the group of substances (G) are dosed. At the end of extruder, excessive water is removed via a vacuum degassing zone, the mixture is cooled using air- or fluid-cooling, and granulated. Humidity of the final pellets can be if necessary adjusted by drying prior to further processing of pellets. A granulation part can be omitted, and some production device for production of final products can preferably replace a granulation unit. Final products can include chill roll films, blown films etc. The procedure is schematically drawn on FIG. 8.

There were prepared reference blends that are not within range of the invention, but they serve only for comparison of mechanical properties with the blends prepared in accordance with the invention. The reference blends of composition mentioned in Table 1 & 2 were prepared under the following conditions:

The twin-screw blending device with co-rotating screws was used as a device, and is characterized by the following parameters:

Screw diameter 26 mm, L/D=40
Screw revolutions: 200 rev./min
Hot-melt temperature 180° C.
Vacuum degassing on the last zone of the screw An extruded blend was cooled by air and then granulated. Prepared blends were processed by chill roll technology, and films of 0.040 mm thickness were prepared by method according to description of the invention.

If TPS was prepared separately, its preparation was as follows:

Dryblend was prepared by mixing in a laboratory high speed mixer produced by company Labtech, and consisting of starch and plasticizer from the group of substances (C). This dryblend was fed to hopper feeder of twin-screw extruder, where it was processed under the following conditions:

Screw diameter 26 mm, L/D=40
Screw revolutions: 200 rev./min
Hot-melt temperature 150° C.
Vacuum degassing on the last zone of the screw
The produced TPS was extruded as a strand, cooled by air, and then granulated.

TABLE 1

Composition of reference blends without plasticizer from the group (F) and without modifier from the group (E)

| No. of blend | (A):(D) | Starch:[(A) + (D)] | (C):Starch | F:[(A) + (D)] | Technological Procedure |
|---|---|---|---|---|---|
| 1 | 80:20 | 30:70 | 30:70 | 0 | TP1 |
| 2 | 40:60 | 30:70 | 30:70 | 0 | TP1 |
| 3 | 5:95 | 30:70 | 30:70 | 0 | TP1 |
| 4 | 95:5 | 30:70 | 30:70 | 0 | TP2 |
| 5 | 80:20 | 30:70 | 30:70 | 0 | TP2 |
| 6 | 40:60 | 30:70 | 30:70 | 0 | TP2 |
| 7 | 5:95 | 30:70 | 30:70 | 0 | TP2 |
| 8 | 95:5 | 30:70 | 30:70 | 0 | TP3 |
| 9 | 80:20 | 30:70 | 30:70 | 0 | TP3 |
| 10 | 40:60 | 30:70 | 30:70 | 0 | TP3 |
| 11 | 5:95 | 30:70 | 30:70 | 0 | TP3 |

TABLE 2

Composition of reference blends with a plasticizer from the group (F) and without modifier from the group (E)

| No. of blend | (A):(D) | Starch:[(A) + (D)] | (C):Starch | F:[(A) + (D)] | Technological Procedure |
|---|---|---|---|---|---|
| 12 | 80:20 | 30:70 | 30:70 | 15:85 | TP1 |
| 13 | 40:60 | 30:70 | 30:70 | 15:85 | TP1 |
| 14 | 5:95 | 30:70 | 30:70 | 15:85 | TP1 |
| 15 | 95:5 | 30:70 | 30:70 | 15:85 | TP2 |
| 16 | 40:60 | 30:70 | 30:70 | 15:85 | TP2 |
| 17 | 5:95 | 30:70 | 30:70 | 15:85 | TP2 |
| 18 | 95:5 | 30:70 | 30:70 | 15:85 | TP3 |
| 19 | 40:60 | 30:70 | 30:70 | 15:85 | TP3 |
| 20 | 5:95 | 30:70 | 30:70 | 15:85 | TP3 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch-Corn Starch
(C)-glycerine
TP1-technological procedure of preparation in one extrusion step where all components were dosed to a main hopper of the twin-screw extruder, and excessive humidity was removed using vacuum prior to output of hot-melt from the extruder. After output from the extruder, hot-melt was cooled by air and granulated.
TP2-technological procedure where at first, during the first extrusion step, the dryblend consist of starch, water-free glycerine and PLA was blended in the twin-screw extruder in such a way that all components were fed to a main hopper of the extruder, excessive humidity was removed from hot-melt by vacuum prior to output from extruder, and the blend was cooled by air and then granulated. The pellets were fed during the second extrusion step to the main hopper together with PHB. Prior to output from extruder, hot-melt was cleared of excessive humidity via vacuum degassing, and after output from extruder, it was cooled by air and granulated.
TP3-technological procedure where at first, during the first extrusion step, thermoplastic starch alone is prepared in a twin-screw extruder. Excessive humidity is removed by vacuum prior to output of hot-melt from the extruder, and after granulation, TPS prepared in such a way is fed during the second extrusion step, together with PLA and PHB, to a main hopper. After cooling by air, the hot-melt is granulated.

Then, the cast films of 0.04 mm thickness are prepared by chill-roll technology, according to the procedure mentioned in the invention description. The mechanical properties given in Table 3 were measured.

TABLE 3

Mechanical properties of the reference blends prepared according to Table 1 & 2.

| No. of blend | (A):(D) | F:[(A) + (D)] | $\sigma_M$ [MPa] | $\varepsilon_b$ [%] |
|---|---|---|---|---|
| 1 | 80:20 | 0 | 7.3 | 1.4 |
| 2 | 40:60 | 0 | n/a | n/a |
| 3 | 5:95 | 0 | n/a | n/a |
| 4 | 95:5 | 0 | 13.4 | 1.1 |
| 5 | 80:20 | 0 | 12.7 | 1.2 |
| 6 | 40:60 | 0 | n/a | n/a |
| 7 | 5:95 | 0 | n/a | n/a |
| 8 | 95:5 | 0 | 11.2 | 1.1 |
| 9 | 80:20 | 0 | 1.4 | 1.1 |
| 10 | 40:60 | 0 | n/a | n/a |
| 11 | 5:95 | 15:85 | n/a | n/a |
| 12 | 80:20 | 15:85 | 4.5 | 71 |
| 13 | 40:60 | 15:85 | 1.7 | 9 |
| 14 | 5:95 | 15:85 | n/a | n/a |
| 15 | 95:5 | 15:85 | 9.2 | 89 |
| 16 | 40:60 | 15:85 | 1.6 | 8 |
| 17 | 5:95 | 15:85 | n/a | n/a |
| 18 | 95:5 | 15:85 | 6.5 | 63 |
| 19 | 40:60 | 15:85 | 4 | 7 |
| 20 | 5:95 | 15:85 | 3 | 4 |

$\sigma_M$-tensile strength
$\varepsilon_b$-relative elongation at break
n/a-measurement cannot be performed as a film cannot be produced from a blend Example 1

According to the invention, blends without component (F) are prepared in accordance with the technological procedure labelled as PROCEDURE PA. Composition of these blends is mentioned in Table 4, and their mechanical properties in Table 5.

The blends in the first as well as second mixing step are mixed using an extruder with the following construction parameters:

A co-rotating twin-screw extruder whose screws overlap each other Screw diameter 26 mm
L/D ratio=40,
and blending was carried out under technological conditions as follow:
Hot melt temperature: 190° C.
Screw revolutions (rate): 250 rev/min
First extrusion step without degassing
Second extrusion step with vacuum degassing on the last but one zone of extruder
Round cross section of die die
Cooling of hot-melt by stream of air, and the next granulation of the cooled strand by a rotation granulator
Preparation of testing pieces, and conditions of measurement of mechanical properties are mentioned in description of the invention.

TABLE 4

Composition of blends without plasticizer with a modifier

| No. of blend | (A):(D) | F:[(A) + (D)] | Starch:[(A) + (D)] | (C):Starch | (E):[Starch + (C)] |
|---|---|---|---|---|---|
| 21 | 95:5 | 0 | 30:70 | 30:70 | 1,1:100 |
| 22 | 80:20 | 0 | 30:70 | 30:70 | 1,1:100 |
| 23 | 40:60 | 0 | 30:70 | 30:70 | 1,1:100 |
| 24 | 5:95 | 0 | 30:70 | 30:70 | 1,1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch-corn starch
(C)-glycerine
(E)-phthalic anhydride

TABLE 5

Mechanical properties of the blends prepared according to Table 4

| No. of Blend | (A):(D) | $\sigma_M$ [MPa] | $\varepsilon_b$ [%] |
|---|---|---|---|
| 21 | 95:5 | 48.9 | 3.3 |
| 22 | 80:20 | 41.7 | 3.4 |
| 23 | 40:60 | 41.1 | 2.2 |
| 24 | 5:95 | 27.5 | 2.1 |

Example 2

According to the invention, the blends mentioned in Table 8 are prepared in accordance with the technological procedure described as PROCEDURE PB. The technological conditions used correspond to Example 1.

TABLE 8

Composition of blends with a plasticizer and with a modifier

| No. of blend | (A):(D) | F:[(A) + (D)] | Starch:[(A) + (D)] | (C):Starch | (E):[Starch + (C)] |
|---|---|---|---|---|---|
| 25 | 95:5 | 15:85 | 30:70 | 30:70 | 1.1:100 |
| 26 | 80:20 | 15:85 | 30:70 | 30:70 | 1.1:100 |
| 24 | 5:95 | 15:85 | 30:70 | 30:70 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch-corn starch
(C)-glycerine
(E)-phthalic anhydride Table 11 includes properties of the blends prepared according to Table 8

TABLE 11

Properties of the blends prepared according to Tab. 8.

| No. of Blend | (A):(D) | $\sigma_M$ [MPa] | $\varepsilon_b$ [%] |
|---|---|---|---|
| 25 | 95:5 | 22.3 | 304 |
| 26 | 80:20 | 22.1 | 316 |
| 27 | 5:95 | 26.1 | 105 |

Example 3

According to the invention, the blends mentioned in Table 13 are prepared in accordance with the technological procedure described as PROCEDURE PC. The technological conditions used correspond to Example 1.

TABLE 13

Composition of the mixtures with different content of modifier

| No. of blend | (A):(D) | F:[(A) + (D)] | Starch:[(A) + (D)] | (C):Starch | (E):[Starch + (C)] |
|---|---|---|---|---|---|
| 28 | 80:20 | 0 | 30:70 | 30:70 | 0.1:100 |
| 29 | 80:20 | 0 | 30:70 | 30:70 | 0.5:100 |
| 30 | 80:20 | 0 | 30:70 | 30:70 | 1.0:100 |
| 31 | 80:20 | 0 | 30:70 | 30:70 | 2.0:100 |
| 32 | 80:20 | 0 | 30:70 | 30:70 | 5.0:100 |
| 33 | 80:20 | 0 | 30:70 | 30:70 | 10.0:100 |
| 34 | 80:20 | 15:85 | 30:70 | 30:70 | 0.05:100 |
| 35 | 80:20 | 15:85 | 30:70 | 30:70 | 0.23:100 |
| 36 | 80:20 | 15:85 | 30:70 | 30:70 | 0.46:100 |
| 37 | 80:20 | 15:85 | 30:70 | 30:70 | 2.75:100 |
| 38 | 80:20 | 15:85 | 30:70 | 30:70 | 5.00:100 |
| 39 | 80:20 | 15:85 | 30:70 | 30:70 | 6.88:100 |
| 40 | 80:20 | 15:85 | 30:70 | 30:70 | 9.18:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch-corn starch
(C)-glycerine
(E)-phthalic anhydride Table 14 includes mechanical properties of the blends prepared according to Table 13.

TABLE 14

Mechanical properties of the blends prepared according to Tab. 13

| No. of blend | (A):(D) | F:[(A) + (D)] | (E):[Starch + (C)] | $\sigma_M$ [MPa] | $\varepsilon_b$ [%] |
|---|---|---|---|---|---|
| 28 | 80:20 | 0 | 0.1:100 | 44.0 | 2.2 |
| 29 | 80:20 | 0 | 0.5:100 | 45.0 | 2.3 |
| 30 | 80:20 | 0 | 1.0:100 | 38.4 | 2.5 |
| 31 | 80:20 | 0 | 2.0:100 | 41.1 | 2.5 |
| 32 | 80:20 | 0 | 5.0:100 | 41.8 | 3.1 |
| 33 | 80:20 | 0 | 10.0:100 | 36.9 | 3.5 |
| 34 | 80:20 | 15:85 | 0.05:100 | 10.3 | 110 |
| 35 | 80:20 | 15:85 | 0.23:100 | 11.6 | 112 |
| 36 | 80:20 | 15:85 | 0.46:100 | 13.8 | 159 |
| 37 | 80:20 | 15:85 | 2.75:100 | 14.7 | 270 |
| 38 | 80:20 | 15:85 | 5.00:100 | 12.1 | 255 |
| 39 | 80:20 | 15:85 | 6.88:100 | 12.1 | 265 |
| 40 | 80:20 | 15:85 | 9.18:100 | 12.0 | 253 |

Example 4

According to the invention, blends corresponding to Table 15 are prepared in accordance with the technological procedure mentioned as PROCEDURE PA. The technological conditions used correspond to Example 1, mechanical properties of the blends are mentioned in Table 16.

TABLE 15

Composition of blends with various content of a plasticizer from the group (F)

| No. of blend | (A):(D) | F:[(A) + (D)] | Starch:[(A) + (D)] | (C):Starch | (E):[Starch + (C)] |
|---|---|---|---|---|---|
| 41 | 80:20 | 15:85 | 30:70 | 5:95 | 1.1:100 |
| 42 | 80:20 | 15:85 | 30:70 | 10:90 | 1.1:100 |
| 43 | 80:20 | 15:85 | 30:70 | 15:85 | 1.1:100 |
| 44 | 80:20 | 15:85 | 30:70 | 20:80 | 1.1:100 |
| 45 | 80:20 | 15:85 | 30:70 | 30:70 | 1.1:100 |
| 46 | 80:20 | 15:85 | 30:70 | 50:50 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch-corn starch
(C)-glycerine
(E)-phthalic anhydride

TABLE 16

Mechanical properties of the blends prepared according to Tab. 15

| No. of Mixture | (C):Starch | $\sigma_M$ [MPa] | $\varepsilon_b$ [%] |
|---|---|---|---|
| 41 | 5:95 | 10.8 | 196 |
| 42 | 10:90 | 13.3 | 215 |
| 43 | 15:85 | 17.2 | 250 |
| 44 | 20:80 | 15.6 | 257 |
| 45 | 30:70 | 23.4 | 299 |
| 46 | 50:50 | 14.9 | 337 |

Example 5

According to the invention, the blends corresponding to Table 17 are prepared in accordance with the technological procedure mentioned as PROCEDURE PA, under technological conditions corresponding to Example 1. The blends are with different types of modifiers from the group (E) according to Table 17, and their mechanical properties are listed in Table 18.

TABLE 17

Composition of blends with different types of modifiers from the group of substances (E)

| No. of blend | Type of Modifier (E) | (A):(D) | F:[(A) + (D)] | Starch:[(A) + (D)] | (C):Starch | (E):[Starch + (C)] |
|---|---|---|---|---|---|---|
| 47 | M2 | 80:20 | 15:85 | 30:70 | 30:70 | 1.1:100 |
| 48 | M3 | 80:20 | 15:85 | 30:70 | 30:70 | 1.1:100 |
| 49 | M4 | 80:20 | 15:85 | 30:70 | 30:70 | 1.1:100 |
| 50 | M5 | 80:20 | 15:85 | 30:70 | 30:70 | 1.1:100 |
| 51 | M6 | 80:20 | 15:85 | 30:70 | 30:70 | 1.1:100 |
| 52 | M7 | 80:20 | 15:85 | 30:70 | 30:70 | 1.1:100 |
| 53 | M8 | 80:20 | 15:85 | 30:70 | 30:70 | 1.1:100 |
| 54 | M9 | 80:20 | 15:85 | 30:70 | 30:70 | 1.1:100 |
| 55 | M10 | 80:20 | 15:85 | 30:70 | 30:70 | 1.1:100 |
| 56 | M11 | 80:20 | 15:85 | 30:70 | 30:70 | 1.1:100 |
| 57 | M12 | 80:20 | 15:85 | 30:70 | 30:70 | 1.1:100 |
| 58 | M13 | 80:20 | 15:85 | 30:70 | 30:70 | 1.1:100 |
| 59 | M14 | 80:20 | 15:85 | 30:70 | 30:70 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch - corn starch
(C) - glycerine
M2 - 1,2,3,6-Tetrahydrophthalic anhydride
M3 - Trimellitic anhydride
M4 - Maleic anhydride
M5 - Hexahydrophthalic anhydride
M6 - Toluene-2,4-diisocyanate dimer
M7 - 4,4'-Diphenylmethane diisocyanate
M8 - Epoxidized styrene and methylmethacrylate copolymer, Mw 6800 g/mol, EEW* = 285 g/mol
M9 - Citric anhydride
M10 - Succinic anhydride
M11 - Citric acid
M12 - Adipic acid
M13 - Hexamethylene diisocyanate
M14 - Pyromellitic dianhydride
*EEW = epoxy equivalent weight

TABLE 18

Mechanical properties of the blends prepared according to Tab. 17

| No. of blend | Type of Modifier (E) | $\sigma_M$ [MPa] | $\varepsilon_b$ [%] |
|---|---|---|---|
| 47 | M2 | 10.9 | 251 |
| 48 | M3 | 18.6 | 255 |
| 49 | M4 | 21.0 | 306 |
| 50 | M5 | 11.5 | 200 |
| 51 | M6 | 11.7 | 189 |
| 52 | M7 | 12.1 | 188 |
| 53 | M8 | 11.4 | 181 |
| 54 | M9 | 23.5 | 334 |
| 55 | M10 | 17.9 | 303 |
| 56 | M11 | 21.2 | 324 |
| 57 | M12 | 10.1 | 153 |
| 58 | M13 | 12.0 | 238 |
| 59 | M14 | 20.0 | 322 |

Example 6

According to the invention, blends are prepared in accordance with the technological procedure mentioned as PROCEDURE PA, under technological conditions corresponding to Example 1. The blends are with different types of PLAs from the group (A) according to Table 19. Their mechanical properties are summarized in Table 20.

TABLE 20

Mechanical properties of the blends prepared according to Tab. 19

| No. of blend | Type of PLA (A) | $\sigma_M$ [MPa] | $\varepsilon_b$ [%] |
|---|---|---|---|
| 60 | PLA 1 | 16.0 | 276 |
| 45 | PLA 2 | 23.4 | 299 |
| 61 | PLA 3 | 16.9 | 291 |
| 62 | PLA 4 | 18.8 | 390 |
| 63 | PLA 5 | 19.8 | 338 |
| 64 | PLA 6 | 17.3 | 308 |
| 65 | PLA 7 | 18.7 | 328 |
| 66 | PLA 8 | 16.1 | 307 |
| 67 | PLA 6: PLA 4 1:1 | 16.4 | 333 |
| 68 | PLA 7: PLA 1 1:1 | 14.2 | 289 |
| 69 | PLA 3: PLA 4 1:1 | 16.2 | 326 |

Example 7

According to the invention, in accordance with the technological procedure mentioned as PROCEDURE PA, under technological conditions corresponding to Example 1, blends were prepared with different types of plasticizers from the group (F) according to Table 21. Their mechanical properties are listed in Table 22.

TABLE 19

Composition of blends with different types of PLAs from the group (A)

| No. of blend | Type of PLAs (A) | (A):(D) | F:[(A) + (D)] | Starch:[(A) + (D)] | (C):Starch | (E):[Starch + (C)] |
|---|---|---|---|---|---|---|
| 60 | PLA 1 | 80:20 | 15:85 | 30:70 | 30:70 | 1.1:100 |
| 45 | PLA 2 | 80:20 | 15:85 | 30:70 | 30:70 | 1.1:100 |
| 61 | PLA 3 | 80:20 | 15:85 | 30:70 | 30:70 | 1.1:100 |
| 62 | PLA 4 | 80:20 | 15:85 | 30:70 | 30:70 | 1.1:100 |
| 63 | PLA 5 | 80:20 | 15:85 | 30:70 | 30:70 | 1.1:100 |
| 64 | PLA 6 | 80:20 | 15:85 | 30:70 | 30:70 | 1.1:100 |
| 65 | PLA 7 | 80:20 | 15:85 | 30:70 | 30:70 | 1.1:100 |
| 66 | PLA 8 | 80:20 | 15:85 | 30:70 | 30:70 | 1.1:100 |
| 67 | PLA 6:PLA 4 1:1 | 80:20 | 15:85 | 30:70 | 30:70 | 1.1:100 |
| 68 | PLA 7:PLA 1 1:1 | 80:20 | 15:85 | 30:70 | 30:70 | 1.1:100 |
| 69 | PLA 3:PLA 4 1:1 | 80:20 | 15:85 | 30:70 | 30:70 | 1.1:100 |

(D) P3HB, Mw = 608 kDa, polydispersity coefficient D = 4.23
(F) acetyltributylcitrate
Starch - corn starch
(C) - glycerine
(E) - phthalic anhydride (A) - type of PLA:

| (A) - Type of PLA | Mw kDa | Index of Polydispersity | Content of D-isomer | $\sigma_M$ [MPa] | $\varepsilon_b$ [%] |
|---|---|---|---|---|---|
| PLA 1 | 202 | 2.18 | 4.20% | 44.3 | 8.9 |
| PLA 2 | 193 | 2.18 | 8% | 43.4 | 3.7 |
| PLA 3 | 140 | 1.9 | 2% | 56.8 | 2.5 |
| PLA 4 | 188 | 1.8 | 12% | 37.9 | 4.7 |
| PLA 5 | 200 | 1.8 | 2% | 58.3 | 2.3 |
| PLA 6 | 162 | 1.81 | <1% | 54.8 | 2.2 |
| PLA 7 | 187 | 1.95 | <1% | 48.4 | 4.1 |
| PLA 8 | 195 | 1.98 | 4% | 46.9 | 2.4 |

Note:
The table summarizes mechanical properties of the films prepared according to procedure included in the invention description, the part "Testing pieces for mechanical properties measurements, and their preparation", from alone PLAs, with no additives.

TABLE 21

Composition of blends with different types of plasticizer PLA from the group (F)

| No. of blend | Type of Plasticizer (F) | (A):(D) | F:[(A) + (D)] | Starch:[(A) + (D)] | (C):Starch | (E):[Starch + (C)] |
|---|---|---|---|---|---|---|
| 45 | F 1 | 80:20 | 15:85 | 30:70 | 30:70 | 1.1:100 |
| 70 | F 2 | 80:20 | 15:85 | 30:70 | 30:70 | 1.1:100 |
| 71 | F 3 | 80:20 | 15:85 | 30:70 | 30:70 | 1.1:100 |
| 72 | F 4 | 80:20 | 15:85 | 30:70 | 30:70 | 1.1:100 |
| 73 | F 5 | 80:20 | 15:85 | 30:70 | 30:70 | 1.1:100 |
| 74 | F 6 | 80:20 | 15:85 | 30:70 | 30:70 | 1.1:100 |
| 75 | F 7 | 80:20 | 15:85 | 30:70 | 30:70 | 1.1:100 |
| 76 | F 8 | 80:20 | 15:85 | 30:70 | 30:70 | 1.1:100 |
| 77 | F 9 | 80:20 | 15:85 | 30:70 | 30:70 | 1.1:100 |
| 78 | F 10 | 80:20 | 15:85 | 30:70 | 30:70 | 1.1:100 |
| 79 | F 11 | 80:20 | 15:85 | 30:70 | 30:70 | 1.1:100 |
| 80 | F 12 | 80:20 | 15:85 | 30:70 | 30:70 | 1.1:100 |
| 81 | F 13 | 80:20 | 15:85 | 30:70 | 30:70 | 1.1:100 |
| 82 | F 14 | 80:20 | 15:85 | 30:70 | 30:70 | 1.1:100 |
| 83 | F 15 | 80:20 | 15:85 | 30:70 | 30:70 | 1.1:100 |
| 84 | F 16 | 80:20 | 15:85 | 30:70 | 30:70 | 1.1:100 |
| 85 | F 17 | 80:20 | 15:85 | 30:70 | 30:70 | 1.1:100 |
| 86 | F 18 | 80:20 | 15:85 | 30:70 | 30:70 | 1.1:100 |
| 87 | F 19 | 80:20 | 15:85 | 30:70 | 30:70 | 1.1:100 |
| 88 | F 20 | 80:20 | 15:85 | 30:70 | 30:70 | 1.1:100 |
| 89 | F 21 | 80:20 | 15:85 | 30:70 | 30:70 | 1.1:100 |
| 90 | F 22 | 80:20 | 15:85 | 30:70 | 30:70 | 1.1:100 |
| 91 | F 23 | 80:20 | 15:85 | 30:70 | 30:70 | 1.1:100 |
| 92 | F 24 | 80:20 | 15:85 | 30:70 | 30:70 | 1.1:100 |
| 93 | F 25 | 80:20 | 15:85 | 30:70 | 30:70 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
Starch - corn starch
(C) - glycerine
(E) - phthalic anhydride (F) type of plasticizer for PLA and/or PHA:

| (F) Plasticizer Type | Chemical Name | Viscosity at 25° C. mPas |
|---|---|---|
| F1 | Acetyltributylcitrate | 33 |
| F2 | Tributylcitrate | 25 |
| F3 | Tris-(2-ethylhexyl)-o-acetylcitrate | 85 |
| F4 | Triacetine | 16 |
| F5 | Oligoester of adipic acid | 3015 |
| F6 | Oligoester of adipic acid | 4082 |
| F7 | Oligoester of adipic acid | 589 |
| F8 | Oligoester of adipic acid | 1041 |
| F9 | Di-octyl terephtalate | 64 |
| F10 | Di-octyl adipate | 12 |
| F11 | Diisononyl phthalate | 55 |
| F12 | Oligoester of adipic acid | 19890 |
| F13 | F1/F3 60:40 | 45 |
| F14 | F1/F3 50:50 | 48 |
| F15 | F1/F3 87:13 | 37 |
| F16 | F1/F3 83:17 | 36 |
| F17 | F1/F2 67:33 | 29 |
| F18 | F1/F4 67:33 | 24 |
| F19 | F2/F3 50:50 | 40 |
| F20 | F2/F1/F3 50:30:20 | 31 |
| F21 | F2/F1 50:50 | 28 |
| F22 | F1/F7 67:33 | 140 |
| F23 | F1/F8 67:33 | 178 |
| F24 | F1/F5 67:33 | 350 |
| F25 | F1/F8 67:33 | 427 |

TABLE 22

Mechanical properties of the blends prepared according to Tab. 21

| No. of blend | Type of Plasticizer (F) | $\sigma_M$ [MPa] | $\epsilon_b$ [%] |
|---|---|---|---|
| 45 | F 1 | 23.4 | 299 |
| 70 | F 2 | 16.0 | 304 |
| 71 | F 3 | 16.4 | 302 |
| 72 | F 4 | 10.6 | 215 |

TABLE 22-continued

Mechanical properties of the blends prepared according to Tab. 21

| No. of blend | Type of Plasticizer (F) | $\sigma_M$ [MPa] | $\epsilon_b$ [%] |
|---|---|---|---|
| 73 | F 5 | 16.0 | 335 |
| 74 | F 6 | 17.9 | 365 |
| 75 | F 7 | 19.5 | 198 |
| 76 | F 8 | 15.9 | 249 |
| 77 | F 9 | 16.8 | 198 |
| 78 | F 10 | 10.2 | 168 |
| 79 | F 11 | 24.6 | 183 |
| 80 | F 12 | 18.1 | 178 |
| 81 | F 13 | 27.0 | 356 |
| 82 | F 14 | 16.5 | 352 |
| 83 | F 15 | 23.5 | 346 |
| 84 | F 16 | 17.1 | 308 |
| 85 | F 17 | 26.5 | 250 |
| 86 | F 18 | 24.4 | 284 |
| 87 | F 19 | 20.17 | 302 |
| 88 | F 20 | 24.4 | 284 |
| 89 | F 21 | 20.17 | 302 |
| 90 | F 22 | 22.0 | 306 |
| 91 | F 23 | 17.0 | 322 |
| 92 | F 24 | 18.1 | 337 |
| 93 | F 25 | 17.1 | 334 |

Example 8

According to the invention, in accordance with the technological procedure mentioned as PROCEDURE PA, under technological conditions corresponding to Example 1, blends with different types of starch were prepared according to Table 23. Their mechanical properties are listed in Table 24.

TABLE 23

Composition of the blends with different types of starch

| No. of blend | Type of Starch | (A):(D) | F:[(A) + (D)] | Starch:[(A) + (D)] | (C):Starch | (E):[Starch + (C)] |
|---|---|---|---|---|---|---|
| 45 | Corn | 80:20 | 15:85 | 30:70 | 30:70 | 1.1:100 |
| 94 | Amaranth | 80:20 | 15:85 | 30:70 | 30:70 | 1.1:100 |
| 95 | Potato | 80:20 | 15:85 | 30:70 | 30:70 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
(C) - glycerine
(E) - phthalic anhydride

TABLE 24

Mechanical properties of the blends prepared according to Tab. 23

| No. of blend | Type of Starch | $\sigma_M$ [MPa] | $\epsilon_b$ [%] |
|---|---|---|---|
| 45 | Corn | 23.4 | 299 |
| 94 | Amaranth | 11.9 | 113 |
| 95 | Potato | 19.4 | 328 |

Example 9

According to the invention, in accordance with the technological procedure mentioned as PROCEDURE PA, under technological conditions corresponding to Example 1, blends with different types of plasticizers from the group (C) were prepared according to Table 25, and their mechanical properties are listed in Table 26.

TABLE 25

Composition of blend with different types of plasticizers from the group (C)

| No. of blend | Type of Plasticizer (C) | (A):(D) | F:[(A) + (D)] | Starch:[(A) + (D)] | (C):Starch | (E):[Starch + (C)] |
|---|---|---|---|---|---|---|
| 45 | Glycerin | 80:20 | 15:85 | 30:70 | 30:70 | 1.1:100 |
| 96 | PEG 300 | 80:20 | 15:85 | 30:70 | 30:70 | 1.1:100 |
| 97 | PEG 600 | 80:20 | 15:85 | 30:70 | 30:70 | 1.1:100 |
| 98 | PEG 1000 | 80:20 | 15:85 | 30:70 | 30:70 | 1.1:100 |
| 99 | MPG | 80:20 | 15:85 | 30:70 | 30:70 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch - corn starch
(C) - glycerine
(E) - phthalic anhydride

TABLE 26

Mechanical properties of the blends prepared according to Tab. 25

| No. of blend | Type of Plasticizer (C) | $\sigma_M$ [MPa] | $\varepsilon_b$ [%] |
|---|---|---|---|
| 45 | Glycerine | 23.4 | 299 |
| 96 | PEG 300 | 12.1 | 257 |
| 97 | PEG 600 | 11.9 | 234 |
| 98 | PEG 1000 | 13.8 | 211 |
| 99 | MPG | 10.6 | 244 |

Example 10

According to the invention, in accordance with the technological procedure mentioned as PROCEDURE PA, under technological conditions corresponding to Example 1, blends with different types of component (D)—PHA were prepared according to Table 27. Their mechanical properties are summarized in Table 28.

TABLE 27

Composition of blends with different types of component (D) - various types of PHA

| No. of blend | Type of PHA (D) | (A):(D) | F:[(A) + (D)] | Starch:[(A) + (D)] | (C):Starch | (E):[Starch + (C)] |
|---|---|---|---|---|---|---|
| 45  | PHA 1 | 80:20 | 15:85 | 30:70 | 30:70 | 1.1:100 |
| 100 | PHA 2 | 80:20 | 15:85 | 30:70 | 30:70 | 1.1:100 |
| 101 | PHA 3 | 80:20 | 15:85 | 30:70 | 30:70 | 1.1:100 |
| 102 | PHA 4 | 80:20 | 15:85 | 30:70 | 30:70 | 1.1:100 |
| 103 | PHA 5 | 80:20 | 15:85 | 30:70 | 30:70 | 1.1:100 |
| 104 | PHA 6 | 80:20 | 15:85 | 30:70 | 30:70 | 1.1:100 |
| 105 | PHA 7 | 80:20 | 15:85 | 30:70 | 30:70 | 1.1:100 |

(A) D,L-PLA, content of D-isomer = 8% Mw = 193 kDa, polydispersity coefficient D = 2.18
(F) acetyltributylcitrate
Starch - corn starch
(C) - glycerine
(E) - phthalic anhydride (D) - type of PHA:

| Type of PHA (D) | PHA | Mw | D index | Co-monomer Content (%) | $\sigma_M$ [MPa] | $\varepsilon_b$ [%] |
|---|---|---|---|---|---|---|
| PHA 1 | P3HB    | 608 | 4.23 |            | 14.8 | 1.4 |
| PHA 2 | P3HB4HV | 460 | 4.53 | 3.1% 4HV   | 27.0 | 3.5 |
| PHA 3 | P3HB4HV | 539 | 4.65 | 5.1% 4HV   | 12.3 | 4.8 |
| PHA 4 | P3HB    | 428 | 3.54 |            | 34.5 | 2.6 |
| PHA 5 | P3HB    | 652 | 5.4  |            | 34.8 | 2.6 |
| PHA 6 | P3HB    | 780 | 3.2  |            | 33.9 | 2.1 |
| PHA 7 | P3HB4HB | 223 | 3.35 | 17.6% 4HB  | 28.7 | 2.3 |

Note:
The table contains mechanical properties of the films prepared according to the procedure included in the invention description, the part "Testing pieces for mechanical properties mesurements, and their preparation", from alone PLAs, with no additives.

TABLE 28

Mechanical properties of the blends prepared according to Tab. 27

| No. of blend | Type of PHA (D) | $\sigma_M$ [MPa] | $\varepsilon_b$ [%] |
|---|---|---|---|
| 45  | PHA 1 | 23.4 | 299 |
| 100 | PHA 2 | 19.9 | 287 |
| 101 | PHA 3 | 19.0 | 264 |
| 102 | PHA 4 | 18.7 | 302 |
| 103 | PHA 5 | 19.2 | 286 |
| 104 | PHA 6 | 20.2 | 298 |
| 105 | PHA 7 | 12.3 | 114 |

Example 11

According to the invention, blends are prepared in accordance with the technological procedure mentioned as PROCEDURE PA, under technological conditions corresponding to Example 1. The blends with addition of nucleation agents from the group of substances (G) were prepared according to Table 29, their mechanical properties are listed in Table 30. The nucleation agents from the group of substances (G) were added according to procedure PA, to a hopper during the second extrusion step PA2.

TABLE 29

Composition of blends with addition of nucleation agents

| No. of blend | Type and Content of Nucleation Agent (G) | (A):(D) | F:[(A) + (D)] | Starch:[(A) + (D)] | (C):Starch | (E):[Starch + (C)] |
|---|---|---|---|---|---|---|
| 106 | B, 1 % | 80:20 | 0:100 | 30:70 | 30:70 | 1.1:100 |
| 107 | M, 1 % | 80:20 | 0:100 | 30:70 | 30:70 | 1.1:100 |
| 108 | B, 1 % | 40:60 | 0:100 | 30:70 | 30:70 | 1.1:100 |
| 109 | M, 1 % | 40:60 | 0:100 | 30:70 | 30:70 | 1.1:100 |
| 110 | B, 1 % | 80:20 | 15:85 | 30:70 | 30:70 | 1.1:100 |
| 111 | M, 1 % | 80:20 | 15:85 | 30:70 | 30:70 | 1.1:100 |
| 112 | B, 1 % | 40:60 | 15:85 | 30:70 | 30:70 | 1.1:100 |
| 113 | M, 1 % | 40:60 | 15:85 | 30:70 | 30:70 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch - corn starch
(C) - glycerine
(E) - phthalic anhydride
M - Talc, substance from the group (G) as a nucleation agent
B - Boron nitride, substance from the group (G) as a nucleation agent

TABLE 30

Mechanical properties of the blends prepared according to Tab. 29

| No. of blend | Type and Content of Nucleation Agent (G) | F:[(A) + (D)] | $\sigma_M$ [MPa] | $\epsilon_b$ [%] |
|---|---|---|---|---|
| 106 | B, 1% | 0:100 | 29.7 | 2.1 |
| 107 | M, 1% | 0:100 | 30.2 | 2.8 |
| 108 | B, 1% | 0:100 | 33.8 | 3.7 |
| 109 | M, 1% | 0:100 | 35.0 | 2.9 |
| 110 | B, 1% | 15:85 | 18.1 | 275 |
| 111 | M, 1% | 15:85 | 18.2 | 180 |
| 112 | B, 1% | 15:85 | 15.1 | 180 |
| 113 | M, 1% | 15:85 | 15.3 | 260 |

Example 12

According to the invention, in accordance with the technological procedure mentioned as PROCEDURE PA: Under technological conditions corresponding to Example 1, blends with addition of fillers according to Table 31 were prepared, and their mechanical properties are listed in Table 32. The fillers from the group (G) were added according to procedure PA to a hopper, during the second extrusion step PA2.

TABLE 31

Composition of blends containing fillers

| No. of blend | Type and Content of Nucleation Agent (G) | (A):(D) | F:[(A) + (D)] | Starch:[(A) + (D)] | (C):Starch | (E):[Starch + (C)] |
|---|---|---|---|---|---|---|
| 114 | P1, 10 % | 80:20 | 0:100 | 30:70 | 30:70 | 1.1:100 |
| 115 | P2, 10 % | 80:20 | 0:100 | 30:70 | 30:70 | 1.1:100 |
| 116 | P1, 10 % | 40:60 | 0:100 | 30:70 | 30:70 | 1.1:100 |
| 117 | P2, 10 % | 40:60 | 0:100 | 30:70 | 30:70 | 1.1:100 |
| 118 | P1, 10 % | 80:20 | 15:85 | 30:70 | 30:70 | 1.1:100 |
| 119 | P2, 10 % | 80:20 | 15:85 | 30:70 | 30:70 | 1.1:100 |
| 120 | P1, 10 % | 40:60 | 15:85 | 30:70 | 30:70 | 1.1:100 |
| 121 | P2, 10 % | 40:60 | 15:85 | 30:70 | 30:70 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch - corn starch
(C) - glycerine
(E) - phthalic anhydride
P1 - Clay, filler from the group (G), calculated 10 wt % on the whole blend
P2 - Calcium carbonate, filler from the group (G), calculated 10 wt % on the whole blend

TABLE 32

Mechanical properties of the blends prepared according to Tab. 29

| No. of blend | Typ and Content of Filler (G) | (A):(D) | F:[(A) + (D)] | $\sigma_M$ [MPa] | $\epsilon_b$ [%] |
|---|---|---|---|---|---|
| 114 | P1, 10% | 80:20 | 0:100 | 30.6 | 2.9 |
| 115 | P2, 10% | 80:20 | 0:100 | 29.5 | 2.8 |
| 116 | P1, 10% | 40:60 | 0:100 | 29.3 | 3.2 |
| 117 | P2, 10% | 40:60 | 0:100 | 48.7 | 3.2 |
| 118 | P1, 10% | 80:20 | 15:85 | 15.1 | 255 |
| 119 | P2, 10% | 80:20 | 15:85 | 21.3 | 272 |
| 120 | P1, 10% | 40:60 | 15:85 | 12.5 | 201 |
| 121 | P2, 10% | 40:60 | 15:85 | 14.6 | 282 |

Example 13

According to the invention, in accordance with the technological procedure mentioned as PROCEDURE PA, under technological conditions corresponding to Example 1, and technological procedure TP1 mentioned in Example 2, the blends were prepared with different content of starch according to Table 33. Mechanical properties are listed in Table 34.

TABLE 33

Composition of the blends with different content of starch

| No. of blend | (A):(D) | F: [(A) + (D)] | Starch: [(A) + (D)] | (C): Starch | (E): [Starch + (C)] |
|---|---|---|---|---|---|
| 122 | 80:20 | 15:85 | 3:97 | 30:70 | 1,1:100 |
| 123 | 80:20 | 15:85 | 10:90 | 30:70 | 1,1:100 |
| 124 | 80:20 | 15:85 | 20:80 | 30:70 | 1,1:100 |
| 45 | 80:20 | 15:85 | 30:70 | 30:70 | 1,1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch—corn starch
(C)—glycerine
(E)—phthalic anhydride

TABLE 34

Mechanical properties of the blends prepared according to Tab. 33

| No. of blend | Starch: [(A) + (D)] | (E): [Starch + (C)] | $\sigma_M$ [MPa] | $\epsilon_b$ [%] |
|---|---|---|---|---|
| 122 | 3:97 | 1,1:100 | 32.6 | 328 |
| 123 | 10:90 | 1,1:100 | 28.7 | 326 |
| 124 | 20:80 | 1,1:100 | 25.9 | 329 |
| 45 | 30:70 | 1,1:100 | 23.4 | 299 |

Example 14

According to the invention, in accordance with the technological procedure mentioned as PROCEDURE PA: under technological conditions corresponding to Example 1, the blends with different types of plasticizers from the group (F) according to Table 35 were prepared. Their mechanical properties are listed in Table 36.

TABLE 35

Composition of the blends with various content of a plasticizer from the group (F)

| No. of blend | (A):(D) | F: [(A) + (D)] | Starch: [(A) + (D)] | (C): Starch | (E): [Starch + (C)] |
|---|---|---|---|---|---|
| 22 | 80:20 | 0:100 | 30:70 | 30:70 | 1.1:100 |
| 125 | 80:20 | 10:90 | 30:70 | 30:70 | 1.1:100 |
| 126 | 80:20 | 13:87 | 30:70 | 30:70 | 1.1:100 |
| 127 | 80:20 | 15:85 | 30:70 | 30:70 | 1.1:100 |
| 128 | 80:20 | 20:80 | 30:70 | 30:70 | 1.1:100 |
| 129 | 80:20 | 25:75 | 30:70 | 30:70 | 1.1:100 |
| 130 | 80:20 | 33:67 | 30:70 | 30:70 | 1.1:100 |
| 131 | 80:20 | 30:70 | 30:70 | 30:70 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate, for the blend No. 131 plasticizer F14 from example 7 was used
Starch—corn starch
(C)—glycerine
(E)—phthalic anhydride

TABLE 36

Mechanical properties of the blends prepared according to Tab. 35

| No. of blend | F:[(A) + (D)] | $\sigma_M$ [MPa] | $\epsilon_b$ [%] |
|---|---|---|---|
| 22 | 0:100 | 41.7 | 2.3 |
| 125 | 10:90 | 18.8 | 372 |
| 126 | 13:87 | 31.4 | 130 |
| 127 | 15:85 | 26.7 | 309 |
| 128 | 20:80 | 18.4 | 252 |
| 129 | 25:75 | 18.1 | 253 |
| 130 | 33:67 | 12.5 | 150 |
| 131 | 30:70 | 14.8 | 151 |

Example 15

According to the invention, in accordance with the technological procedure mentioned as PROCEDURE PA: under the technological conditions corresponding to Example 1, the blends according to Table 37 were prepared, wherein during the extrusion step PA2, a head for production of films, and a chill roll unit were attached directly to the twin-screw extruder. Samples for mechanical properties measurements were prepared by the chill roll technology. The mechanical properties are listed in Table 38.

TABLE 37

Composition of the blends with different content of starch

| No. of blend | (A):(D) | F: [(A) + (D)] | Starch: [(A) + (D)] | (C): Starch | (E): [Starch + (C)] |
|---|---|---|---|---|---|
| 132 | 80:20 | 15:85 | 40:60 | 30:70 | 1.1:100 |
| 133 | 80:20 | 15:85 | 50:50 | 30:70 | 1.1:100 |
| 134 | 80:20 | 15:85 | 50:50 | 30:70 | 1.1:100 |
| 135 | 80:20 | 15:85 | 50:50 | 30:70 | 1.1:100 |
| 136 | 80:20 | 15:85 | 60:40 | 30:70 | 1.1:100 |

(A) D,L-PLA, content of D-isomer = 8% Mw = 193 kDa, polydispersity coefficient D = 2.18
(D) P3HB, Mw = 608 kDa, polydispersity coefficient D = 4.23
(F) acetyltributylcitrate
Starch—corn starch
(C)—glycerine
(E)—phthalic anhydride

TABLE 38

Mechanical properties of the blends prepared according to Tab. 37

| No. of blend | Starch: [(A) + (D)] | (C):Starch | $\sigma_M$ [MPa] | $\epsilon_b$ [%] |
|---|---|---|---|---|
| 132 | 40:60 | 30:70 | 21.1 | 346 |
| 133 | 50:50 | 30:70 | 12.5 | 302 |
| 134 | 50:50 | 25:75 | 13.1 | 301 |
| 135 | 50:50 | 20:80 | 11.5 | 184 |
| 136 | 60:40 | 30:70 | 3.6 | 235 |

Example 16

According to the invention, according to the technological procedure mentioned as PROCEDURE PA: under the technological conditions corresponding to Example 1, the blends according to Table 38 were prepared, wherein during the extrusion step PA2, a head for production of films, and a chill roll unit were attached directly to the twin-screw extruder. Samples for mechanical properties measurements were prepared by the chill roll technology. The mechanical properties are listed in Table 39.

TABLE 38B

Composition of blends with various content of a plasticizer from the group (F)

| No. of blend | (A):(D) | F: [(A) + (D)] | Starch: [(A) + (D)] | (C): Starch | (E): [Starch + (C)] |
|---|---|---|---|---|---|
| 137 | 80:20 | 7:93 | 40:60 | 30:70 | 1.1:100 |
| 138 | 60:40 | 7:93 | 40:60 | 30:70 | 1.1:100 |
| 139 | 80:20 | 7:93 | 40:60 | 30:70 | 1.1:100 |
| 140 | 60:40 | 7:93 | 40:60 | 30:70 | 1.1:100 |

(A) D,L-PLA, content of D-isomer = 12% Mw = 188 kDa, polydispersity coefficient D = 1.8
(D) P3HB, Mw = 708 kDa, polydispersity coefficient D = 3.2
(F)—F6 from Example 7; oligoester of adipic acid, viscosity at 25° C. mPas
Starch—corn starch
(C)—glycerine
(E)—phthalic anhydride

TABLE 39

Mechanical properties of the blends prepared according to Tab. 38B

| No. of blend | (A):(D) | F:[(A) + (D)] | $\sigma_M$ [MPa] | $\epsilon_b$ [%] |
|---|---|---|---|---|
| 137 | 80:20 | 7:93 | 18.1 | 268 |
| 138 | 60:40 | 7:93 | 12.0 | 149 |
| 139 | 80:20 | 7:93 | 20.2 | 181 |
| 140 | 60:40 | 7:93 | 13.3 | 115 |

INDUSTRIAL APPLICABILITY

A solution according to the present invention provides production of a biodegradable polymer blend consisting of thermoplastic starch and polyhydroxyalkanoate, wherein the blend has enhanced mechanical properties. The biodegradable polymer blend is ecological and cost-effective, with potential applications mainly in the agriculture and packaging industry sectors.

The invention claimed is:

1. A method for preparation of a biodegradable polymer blend, the biodegradable polymer blend comprising at least one component (A), at least one component (B), and at least one component (D), wherein component (A) includes polymers based on lactic acid, wherein the polymers based on lactic acid comprise homopolymers of PLLA, PDLA, as well as their copolymers, or mixtures of their homopolymers, mixtures of their homopolymers and copolymers, or mixtures of their copolymers;

component (B) includes thermoplastic starch (TPS), representing a mixture of starch, at least one plasticizer from the group of substances (C), and at least one modifier from the group of substances (E), wherein the at least one plasticizer from the group of substances (C) comprises OH groups, and wherein the at least one modifier from the group of substances (E) reacts with the OH groups of the at least one plasticizer from the group of substances (C);

group of substances (C) includes plasticizers for starch;

group of substances (E) includes modifiers, wherein the modifiers comprise saturated or unsaturated carboxylic acids, dicarboxylic acids, tricarboxylic acids or polycarboxylic acids, saturated or unsaturated anhydrides, and mixed anhydrides of carboxylic acids, substances containing isocyanate groups, substances containing expoxide groups, acyl halides, acyl imidazoles, acylphosphates, thioesters of acids, or a combination thereof;

component (D) includes homopolymers or copolymers of polyhydroxyalkanoates (PHAs), and/or their mixtures; and the biodegradable polymer blend optionally contains component (F) and component (G), wherein component (F) includes plasticizers for PLA and/or for PHA, and component (G) comprises inorganic fillers, organic fillers, compatibilizers, interphase agents, pigments, dyes, nucleating agents, processing aids, anti-block additives, slip additives, cross-linking additives, foaming agents, antistatic additives, flame retardants, antidegradants, other additives, other modifiers, or a combination thereof, wherein the biodegradable polymer blend is prepared in a such way that components (A) and (B) are blended, wherein component (B) is present in the blend at least in one phase of the mixing process where simultaneously at least one component (B) and at least one component (A) are blended, and this phase of the blending process precedes by at least one phase that blending phase of the blending process where component (D) is added to the blending process, and the optional component (F) and the optional component (G) can be added to the blend in any one or multiple phases of the blending process, either in one or in multiple doses.

2. The method for preparation of the biodegradable polymer blend of claim 1, wherein at the beginning of blending process, a dryblend is prepared by mixing at ambient temperature, wherein the dryblend consists of starch and at least one of the modifiers, and the dryblend optionally can contain one or more of the plasticizers for starch, and together with the dryblend, also a polymer from the group (A) can be added to the blend, wherein at least one substance from the group (C) is added to the blend at latest in that phase of the blending process which precedes by at least one phase the phase of the blending process in which component (D) is added to the blend, and at least one substance from the group (A) is added to the blend in that phase of the blending process which precedes at least one phase that phase of the blending process in which component (D) is added to the blend, wherein the order of dosing substances from the group (A) and (C) is discretionary, and one or multiple components (D) of the homopolymers or copolymers of polyhydroxyalkanoates (PHAs), and/or their mixtures are added to the blend in a such phase of the blending process, which follows by at least one phase of the blending process the phase in which are simultaneously blended: starch, at least one component (A), at least one substance from the group (C), and at least one substance from group (E); wherein components (F) and (G) can be added to the blend in any phase of the blending process; and before the output of a hot-melt from the last blending step, an amount of humidity of the blend is removed by atmospheric or vacuum degassing, and the produced blend in hot-melt form is:
  (i) cooled by liquid or gas, preferably by water or air, and granulated
  (ii) or lead to an extruder die for producing final products or intermediates.

3. The method for preparation of the biodegradable polymer blend of claim 2, further comprising a multiple step method of production, and hot-melt of the blend containing at least one component (A) and at least one component (B) without presence of component (D) is, without removal of an amount of water on output from the given blend step, cooled by liquid or gas, and granulated, and the produced pellets are fed to the next blending step, wherein also a polymer from the group (D) is added to the blend together with the pellets, or the polymer from the group (D) is added to the blend no later than the penultimate blending phase of the given blending step, and the amount of humidity is removed by atmospheric or vacuum degassing before the completion of the last blending step, prior to output from the blending device, and the produced blend in a form of hot-melt is then:
  (i) cooled by liquid or gas and granulated
  (ii) or lead to an extruder die for producing final products or intermediates.

4. The method for preparation of the biodegradable polymer blend of claim 3, wherein the production is performed in a blending device in two blending steps.

5. The method for preparation of the biodegradable polymer blend of claim 1, comprising a multiple step method of production, and hot-melt of the blend containing at least one component (A) and at least one component (B) without presence of component (D) is, without removal of an amount of water on output from the given blend step, cooled by liquid or gas, and granulated, and the produced pellets are fed to the next blending step, wherein also a polymer from the group (D) is added to the blend together with the pellets, or the polymer from the group (D) is added to the blend no later than the penultimate blending phase of the given blending step, and an amount of humidity is removed by atmospheric or vacuum degassing before the completion of the last blending step, prior to output from the blending device, and the produced blend in a form of hot-melt is then:
  (i) cooled by liquid or gas and granulated
  (ii) or lead to an extruder die for producing final products or intermediates.

* * * * *